(12) United States Patent
Tsotsis et al.

(10) Patent No.: US 9,381,675 B2
(45) Date of Patent: Jul. 5, 2016

(54) STABILIZED DRY PREFORM AND METHOD

(75) Inventors: Thomas Karl Tsotsis, Santa Ana, CA (US); Gerould K. Young, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 13/307,654

(22) Filed: Nov. 30, 2011

(65) Prior Publication Data

US 2013/0134621 A1 May 30, 2013

(51) Int. Cl.
*B29C 47/78* (2006.01)
*B29B 11/16* (2006.01)
*B29C 70/52* (2006.01)
*B29K 101/12* (2006.01)

(52) U.S. Cl.
CPC ............... *B29B 11/16* (2013.01); *B29C 70/52* (2013.01); *B29K 2101/12* (2013.01)

(58) Field of Classification Search
CPC ..... B29B 11/16; B29C 70/52; B29K 2101/12
USPC .......... 425/384, 394; 264/137, 136, 257, 323; 156/166, 180, 242, 245
See application file for complete search history.

(56) References Cited

U.S. PATENT DOCUMENTS

| | | | | |
|---|---|---|---|---|
| 4,559,262 A * | 12/1985 | Cogswell | ................... | B29B 9/14 156/166 |
| 4,842,667 A * | 6/1989 | Thorsted, Jr. | ............ | B29C 70/52 156/166 |
| 5,084,222 A * | 1/1992 | Glemet | .................. | B29C 70/521 156/180 |
| 5,114,516 A * | 5/1992 | Pilling | ................... | B29B 15/105 156/245 |
| 5,217,656 A | 6/1993 | Buckley | | |
| 5,338,497 A | 8/1994 | Murray | | |
| 5,645,744 A | 7/1997 | Matsen | | |
| 5,723,849 A | 3/1998 | Matsen | | |
| 5,728,309 A | 3/1998 | Matsen | | |
| 5,808,281 A | 9/1998 | Matsen | | |
| 5,866,253 A * | 2/1999 | Philipps | ................... | B29B 11/16 156/167 |
| 5,972,503 A * | 10/1999 | Woodside | ............. | B29B 15/122 156/180 |
| 6,528,771 B1 | 3/2003 | Matsen | | |
| 6,764,754 B1 * | 7/2004 | Hunter | .................... | B29C 70/30 427/386 |
| 6,914,225 B2 | 7/2005 | Fischer | | |
| 6,955,735 B2 * | 10/2005 | Kusek | ................... | B29C 70/521 156/166 |

(Continued)

FOREIGN PATENT DOCUMENTS

DE WO 2009106341 A2 * 9/2009 .............. B29C 70/46
EP 2006074 12/2008

(Continued)

OTHER PUBLICATIONS

Mallick, "Composites Engineering Handbook," p. 595, ISBN 0-8247-9304-8, dated 1997.*

(Continued)

*Primary Examiner* — Alison L Hindenlang
*Assistant Examiner* — Lawrence D Hohenbrink, Jr.

(57) ABSTRACT

A method of forming a preform may include providing a layer of tackified fibrous material containing structural fibers and resin. The layer may be passed through a forming die set having a die cross-sectional shape. The thermoplastic resin may be heated. The layer may be formed into the die cross-sectional shape. The thermoplastic resin may be allowed to solidify in a manner such that a preform is formed having the die cross-sectional shape.

21 Claims, 15 Drawing Sheets

(56) References Cited

U.S. PATENT DOCUMENTS

| | | |
|---|---|---|
| 7,413,694 B2 | 8/2008 | Waldrop |
| 7,955,548 B2 | 6/2011 | Buckley |
| 2002/0056508 A1* | 5/2002 | Brandstrom .......... B29C 70/526 |
| | | 156/180 |
| 2004/0009338 A1* | 1/2004 | Jo ....................... B29C 47/0023 |
| | | 428/297.4 |
| 2005/0059309 A1 | 3/2005 | Tsotsis |
| 2007/0013096 A1 | 1/2007 | Rekret |
| 2007/0023975 A1 | 2/2007 | Buckley |
| 2008/0157437 A1 | 7/2008 | Nelson et al. |
| 2009/0050263 A1* | 2/2009 | Suzuki .................. B29C 43/203 |
| | | 156/245 |
| 2009/0301641 A1* | 12/2009 | Asahara .................. B29B 11/16 |
| | | 156/148 |
| 2010/0065552 A1 | 3/2010 | Matsen |
| 2011/0048624 A1* | 3/2011 | Nitsch ..................... B29C 70/46 |
| | | 156/228 |
| 2011/0229720 A1 | 9/2011 | Matsen |

FOREIGN PATENT DOCUMENTS

| | | |
|---|---|---|
| WO | WO2009106341 | 9/2009 |
| WO | WO 2009106341 A2 * | 9/2009 |

OTHER PUBLICATIONS

Kutz, "Handbook of Materials Section," p. 1104, ISBN 0-471-35924-6, dated 2001.*

COMFIL, "COMFIL Commingling Process," <http://www.comfil.bix/processing.php>, accessed Sep. 19, 2015.*

Kim et al., "A Model of a Thermoplastic Pultrusion Process Using Commingled Yarns," Abstract, <http://www.sciencedirect.com/science/article/pii/S0266353800002347>, dated 2001, accessed Oct. 5, 2015.*

U.S. Appl. No. 13/097,846, System and Method of Adjusting the Equilibrium Temperature of an Inductively-Heated Susceptor, filed Nov. 28, 2011.

Wikipedia, Pultrusion Article, last visited Nov. 14, 2011.

European Search Report for EP 12193391 dated Nov. 21, 2014.

Kutz, "Handbook_of_Materials_Selection," p. 1104, ISBN 0-471-35924-6, dated 2001.

Comfil, "Thermoplastic Composites," <http://www.comfil.biz/processing.php>, accessed Sep. 19, 2015.

* cited by examiner

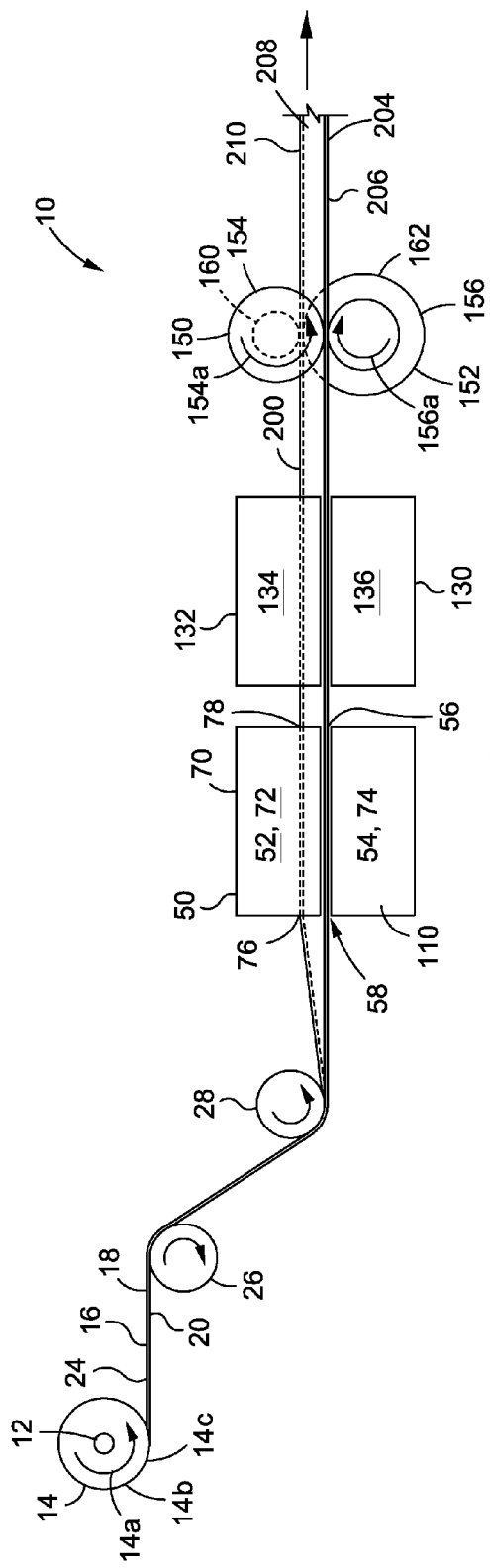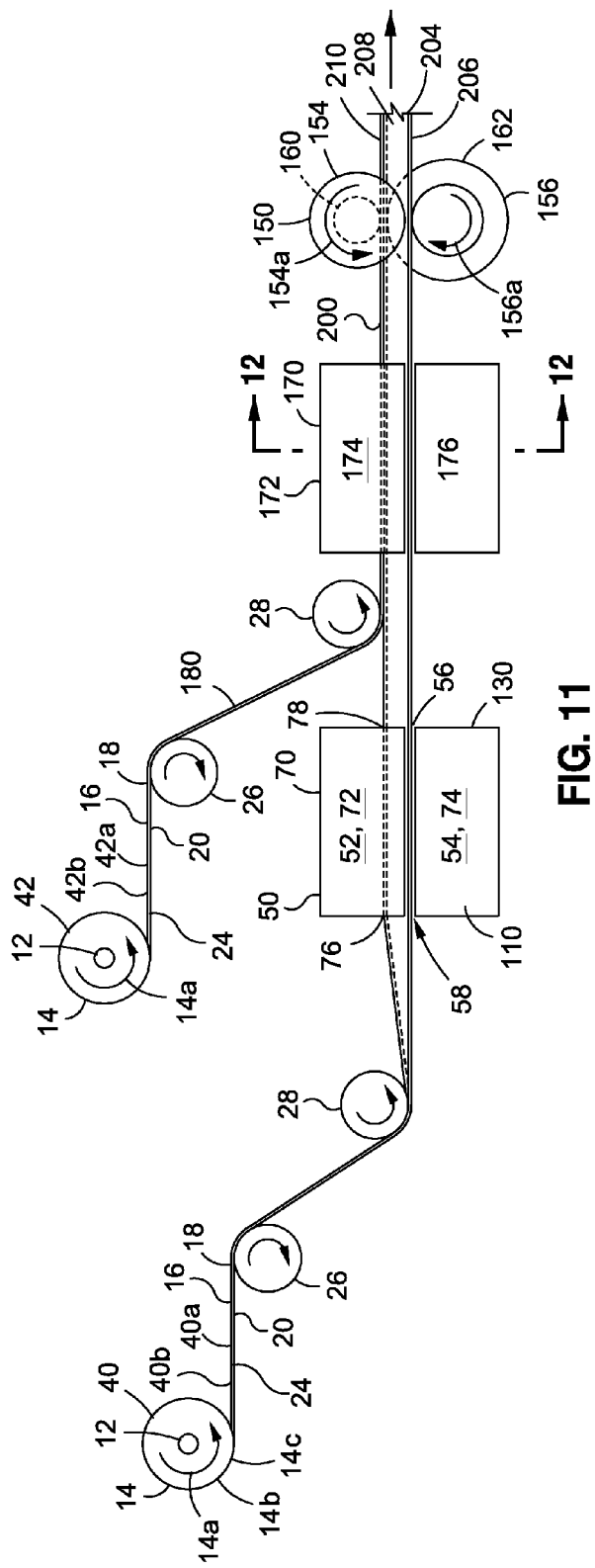

STABILIZED DRY PREFORM AND METHOD

FIELD

The present disclosure relates generally to composites and, more particularly, to a system and method for forming a preform as may be used in fabricating a composite article.

BACKGROUND

When forming composite articles, it may be necessary to position multiple composite plies on a tool at specified locations and at specified fiber orientations. In this regard, it is typically desirable to position the plies such that the fibers in each ply are oriented at a specified angle relative to the remaining plies in the stack and relative to the tool. When forming composite articles having a relatively simple geometry such as a planar geometry, the positioning of each ply on the tool at the desired fiber orientation may be performed without excessive difficulty.

However, when laying up composite plies on a tool having a complex three-dimensional geometry, positioning of the composite plies may be a challenging and labor-intensive process due to difficulties in laying up each ply such that the fibers are maintained at the desired angle along the three-dimensional geometry of the tool. Furthermore, the fibers must be maintained at the desired orientation during infusion of the ply stack with matrix material and while heat and pressure are applied which may add to the complexity of forming the composite article. In this regard, tooling aids may be employed to facilitate the alignment and positioning of the composite plies on the tool. Unfortunately, such tooling aids increase the time, cost, and complexity associated with forming the composite article.

As can be seen, there exists a need in the art for a system and method for positioning composite plies on a tool such that the composite plies may be placed on the tool at the desired position and location without the need for tooling aids. Further in this regard, there exists a need in the art for a system and method for positioning composite plies on a tool that may reduce the amount of touch labor required for positioning the composite plies such that the fibers in each ply are maintained at the desired orientation.

SUMMARY

The above-noted needs associated with forming composite articles are addressed and alleviated by the present disclosure which, in an embodiment, provides a method of forming a preform which may include providing a layer of tackified fibrous material containing structural fibers and resin. The method may further include passing the layer through a forming die set having a die cross-sectional shape. The method may include heating the resin. The method may additionally include forming the layer into the die cross-sectional shape, and allowing the resin to solidify in a manner such that a preform is formed having the die cross-sectional shape.

In a further embodiment, disclosed is a method of forming a composite article which may include providing at least one layer of fibrous material containing structural fibers and up to approximately 10 percent by volume of resin such as between approximately 1 to 10 percent by volume of resin. The method may further include passing the layer through a forming die set having a die cross-sectional shape, and heating the resin with a heating device. The method may additionally include forming the layer into the die cross-sectional shape, and allowing the resin to solidify in a manner such that a preform is formed having the die cross-sectional shape. The method may also include positioning the preform with additional fibrous material, infusing the preform and the additional fibrous material with matrix material, and curing the matrix material to form a composite article.

Also disclosed is a system for forming a preform and which may include a forming die set having a die cross-sectional shape. The forming die set may be configured to receive a layer of tackified fibrous material including resin. The system may include a pulling mechanism configured to draw the layer through the forming die set, and a heating device configured to heat the resin in a manner such that the layer is formed into a preform retaining the die cross-sectional shape when the resin solidifies.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 10 is a side view illustration of an embodiment of the system having a cooling die set located downstream of the forming die set;

FIG. 11 is a side view illustration of an embodiment of the system having a laminating die set located downstream of the forming die set for laminating a subsequent layer of fibrous material with the preform;

DETAILED DESCRIPTION

Figure 1:
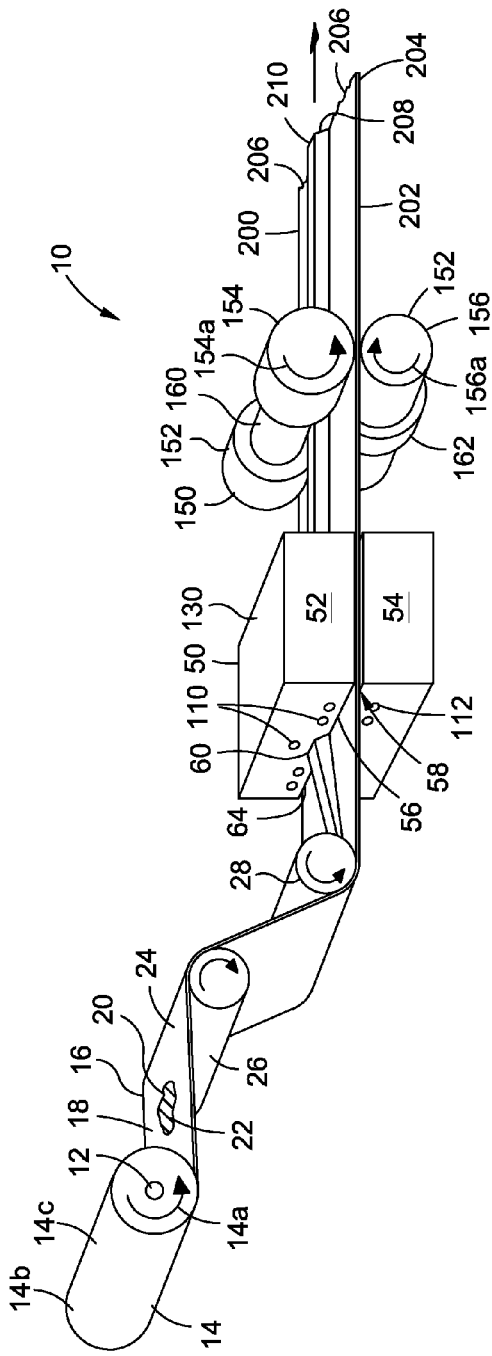
FIG. 1 is a perspective view illustration of an embodiment of a system for continuous forming of one or more layers of fibrous material into a preform having a desired cross-sectional shape.
Figure 18:
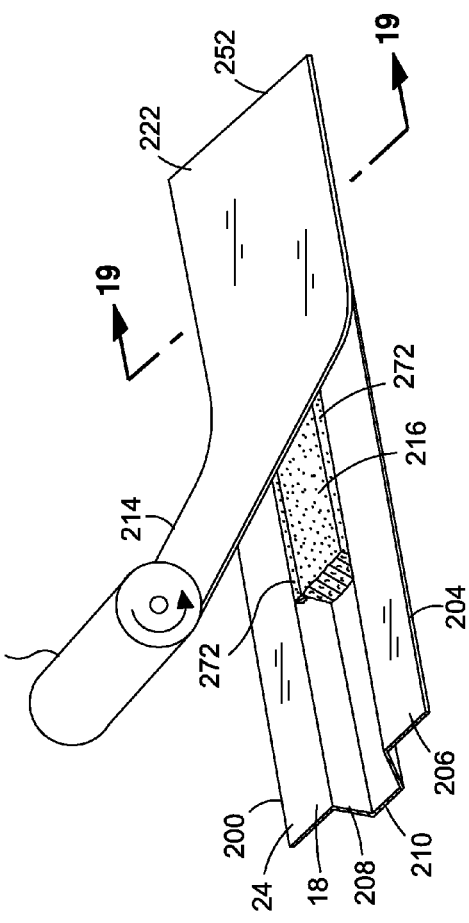
FIG. 18 is a perspective view illustration of the application of an additional layer of fibrous material over the preform for subsequent infusion with matrix material and curing thereof to form a composite article as a hat-section stringer.
Figure 19:
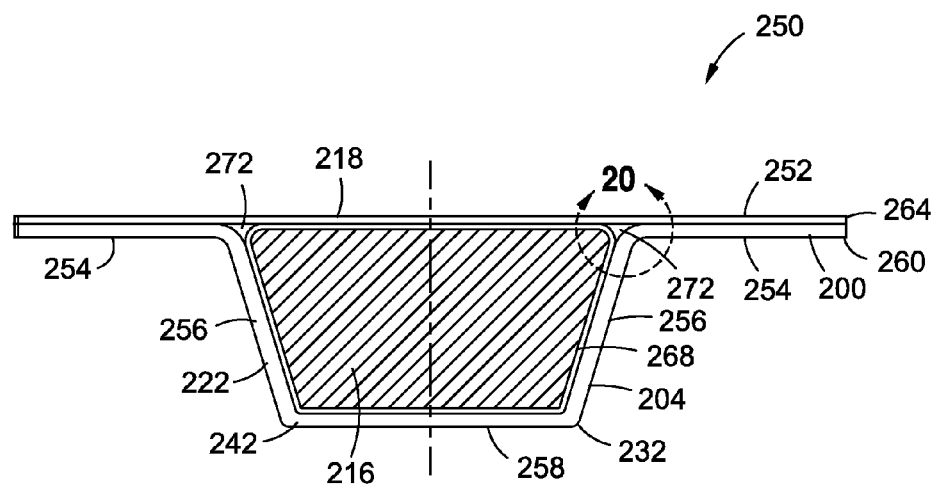
FIG. 19 is a cross-sectional view of the composite article taken along line 19 of FIG. 18 and illustrating the hat-section stringer.

Referring now to the drawings wherein the showings are for purposes of illustrating preferred and various embodiments of the disclosure, shown in FIG. 1 is an embodiment of a system 10 for continuous forming of one or more layers 16 of fibrous material 18 into a preform 200 having a desired preform cross-sectional shape 202. Each layer 16 of fibrous material 18 includes a low volume fraction of resin 24 relative to the total volume of the layer 16. The resin may be pre-applied to at least a portion of the layer(s) 16. The resin-coated layer(s) 16 may be drawn from one or more material rolls 14 and heated to soften the resin 24 to allow forming of the layer(s) 16 into a desired cross-sectional shape using a forming die set 50. The cross-sectional shape of the layer(s) 16 may be retained when the resin 24 solidifies such as by allowing the resin 24 to cool. In this manner, the preform 200 may be formed as a near-net shape preform 200 having a preform cross-sectional shape 202 that may be complementary to or may substantially approximate a desired cross-sectional shape of a final composite article 250 (FIG. 19) to be formed using the preform 200. The preform 200 may be co-processed and/or joined with one or more additional preforms 200 or additional layers of fibrous material 214 (FIG. 18), infused with matrix material 222 (FIG. 18), and cured to form the composite article 250 (FIG. 19).

Advantageously, by forming the preform 200 (FIG. 1) in a near-net shape of the final composite article 250 (FIG. 19), handling and positioning of the preform 200 is simplified. In this regard, positioning of relatively complex three-dimensional fibrous layers (not shown) relative to other fibrous layers (not shown) in a stack (not shown) may be performed with increased accuracy and without the need for tooling aids (not shown) as may be conventionally required for handling and/or positioning multiple fibrous layers (not shown) that typically make up a composite article. It should be noted that although the present disclosure is described in the context of forming a preform 200 in a hat-section 204 (FIG. 19) as may be used in forming a hat stringer 252 (FIG. 19), the system 10 (FIG. 1) may be used to form a preform 200 in any shape, without limitation, and is not limited to forming the preform 200 in a hat-section 204. For example, the system 10 may be configured to form the preform in a "Z" section, an "L" section, a "T" section, an "I" section, a "J" section, a blade section, and any one of a variety of other cross-sectional shapes, without limitation.

In FIG. 1, the system 10 may include a forming die set 50 and a pulling mechanism 150 for pultruding one or more continuous layers 16 of the fibrous material 18 through the forming die set 50. As indicated above, the layer(s) 16 of fibrous material 18 may include a relatively low volume fraction of resin 24 which may comprise thermoplastic or thermosetting resin. The resin 24 may be provided in an amount sufficient to allow for forming of the layer(s) 16 into a die cross-sectional shape 56 using the forming die set 50 such that die cross-sectional shape 56 may be retained in the preform 200 when the resin 24 solidifies. The resin 24 may also be provided in an amount sufficient to tackify the layer(s) 16 together to promote adhesion with adjacent layers 16 and promote adhesion between adjacent fibers 20 within a given layer 16 to allow for handling, positioning, and assembling the preforms 200 relative to one another and/or relative to a tool (not shown).

In an embodiment, the resin 24 (FIG. 1) may have properties such that the resin 24 has relatively low tack or substantially no tack at room temperature and has an increased amount of tack once the resin 24 is heated. In this manner, one or more layers 16 (FIG. 1) of fibrous material 18 (FIG. 1) may be stored on a material roll 14 (FIG. 1) and may be dispensed therefrom without resistance due to adhesion between layers 16. In a further embodiment, the resin 24 may have properties that cause the resin 24 to tackify upon the removal of heat and wherein the viscosity of the resin 24 may increase with the removal of the heat. For example, one or more of the layers 16 of fibrous material 18 may be cooled or refrigerated to reduce the temperature of the resin 24 and promote tacking while the viscosity of the resin 24 increases to solidify the resin 24 causing the preform 200 (FIG. 1) to retain a die cross-sectional shape 56 ((FIG. 1). The resin 24 may also be applied to localized areas (not shown) of the layer(s) 16. In this regard, the resin 24 may be applied to selected areas (not shown) of a layer 16 and is not necessarily applied to the entire length and/or width of a layer 16. For example, the resin 24 may be applied to areas (not shown) of the layer 16 sufficient to allow the layer 16 to retain the die cross-sectional shape 56. For example, application of resin 24 to the layer(s) 16 may be limited to localized areas (not shown) where the layer 16 will be formed into a non-planar shape (not shown) such as a bend or a curved shape (not shown) in the layer 16. In an embodiment, the resin 24 may be applied to areas of the layer 16 that may be formed into a radius (not shown) of the die cross-sectional shape 56.

The volume fraction of the resin 24 (FIG. 1) applied to the layer(s) 16 (FIG. 1) may be such that after one or more layer(s) 16 are passed through the forming die set 50 (FIG. 1), the preform 200 may retain the die cross-sectional shape 56 (FIG. 1) upon solidification of the resin 24. The volume fraction of resin 24 in the fibrous layer 16 is preferably relatively low such that the preform 200 retains a generally porous nature to allow for substantially uniform infusion and distribution of matrix material 222 (FIG. 19) throughout a substantial majority of the composite article 250. In addition, the resin 24 volume fraction is preferably relatively low such that any effects of the resin 24 on the strength and stiffness properties of the final composite article 250 (FIG. 19) are minimized.

In an embodiment, the layer 16 (FIG. 1) of fibrous material 18 (FIG. 1) may contain between approximately 1 and 10 percent by volume of resin 24 (FIG. 1) relative to the total volume of the layer 16 of fibrous material 18. However, volume fractions larger or smaller than 1 and 10 percent are contemplated. For example, in an embodiment, the layer 16 of fibrous material 18 may contain between approximately 2 to 4 percent by volume of resin 24. The resin 24 may be pre-applied to the fibrous material 18 by any suitable means such as by spraying, brushing, or rolling onto the fibrous material 18 (FIG. 1) or by other means. The volume fraction of resin 24 is preferably such that upon solidification of the resin 24, the preform 200 maintains the cross-sectional shape of the forming die set 50 (FIG. 1). The preform 200 may then be handled and positioned without the need for handling aids (not shown) or tooling aids (not shown) when positioning the preform 200 (FIG. 1) with other preforms (not shown) or with additional layers of fibrous material 214 (FIG. 18) prior to infusion with matrix material 222 (FIG. 18).

In addition to the resin 24 (FIG. 1) that is pre-applied to each layer 16 (FIG. 1) of fibrous material 18 (FIG. 1), each layer 16 of fibrous material 18 contains structural fibers 20 (FIG. 1) that may be arranged in any one of a variety of different configurations and/or fiber orientations (e.g., 0, 30, 45, 60, 75, 90 degrees or other angles) and which may be formed using any one of a variety of different materials or material combinations. For example, the fibrous material 18 may comprise woven or non-woven fabric to which the resin 24 may be applied. The fibrous material 18 may also be formed of organized tows of the structural fibers 20 having a unidirectional arrangement, a bidirectional arrangement, or other multi-directional arrangements or fiber orientations. In this regard, embodiments of the fibrous material 18 may also include, but are not limited to, multi-axial fabric, braided fabric, warp-knit fabric, and any one of a variety of other configurations of the fibrous material 18.

The material from which the structural fibers 20 (FIG. 1) are formed may include aramids, polyolefins, metal, glass, carbon, boron, ceramic, mineral, and any one of a variety of other materials or combination of materials. For example, the structural fibers 20 may be formed of any one of the following materials: polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyetheretherketone, polyarylamide, polyketone, polyphthalamide, polyphenylenether, polybutylene terephthalate, polyethylene terephthalate, polyester-polyarylate, polyaramid, polybenzoxazole, viscose, and other materials.

The resin 24 (FIG. 1) may be commingled, intimately blended, or otherwise mixed with the structural fibers 20 (FIG. 1). In addition, the resin 24 may be provided in any one of a variety of material compositions. For example, the resin 24 may be provided in at least one of the following material compositions: acrylics, fluorocarbons, polyamides, polyethylenes, polyesters, polypropylenes, polycarbonates, polyurethanes, polyetheretherketones, polyetherketoneketones, polyetherimides, and other material compositions. The resin 24 may be provided in a material composition having a melting point or glass-transition temperature that may be higher than the temperature at which the matrix material 222 (FIG. 18) cures in the final composite article 250 (FIG. 19) to provide favorable effects on the strength of the final composite article 250 at elevated temperatures.

Figure 2:
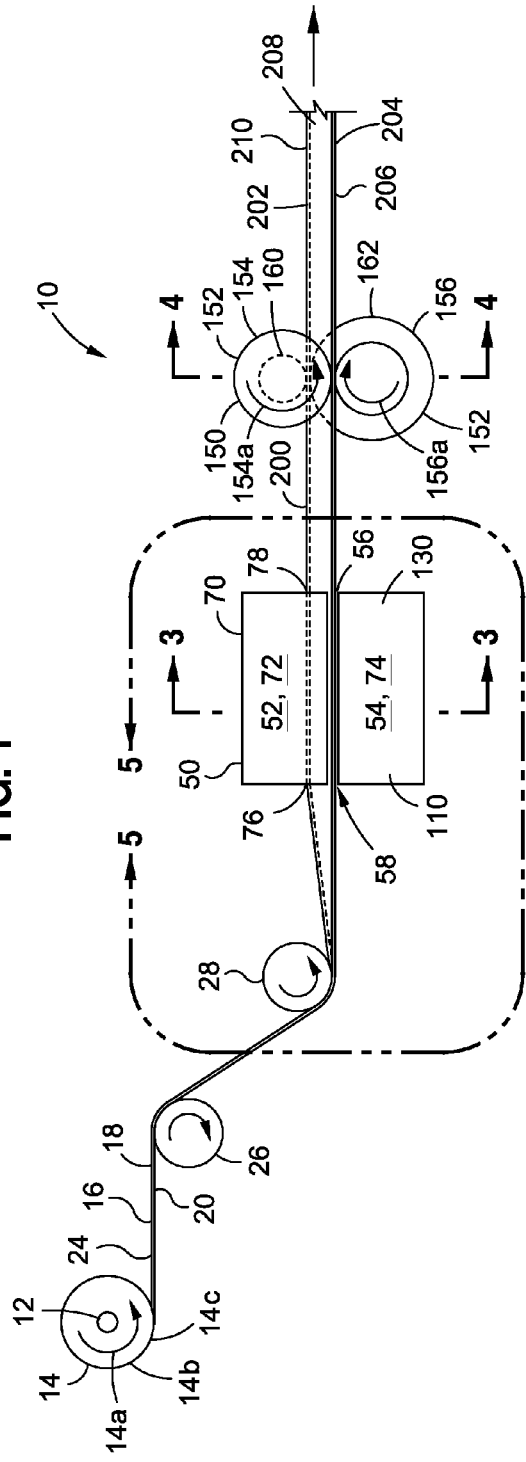
FIG. 2 is a side view illustration of the system of FIG. 1 and illustrating a forming die set and a pulling mechanism for pultruding the layer through the forming die set.

Referring to FIGS. 1-2, the layer 16 of fibrous material 18 may be dispensed from a material roll 14 mounted on a spool 12 that may rotate along a rotational direction 14a. The layer(s) 16 may be dispensed from one or more single-ply material rolls 14b containing a single layer 16 of fibrous material 18 having a desired resin and fiber material composition, thickness, and fiber orientation and arrangement as described below. In addition, the layer(s) 16 may be dispensed from one or more multi-ply material rolls 14c containing a plurality of the layer(s) 16 of the same resin and fiber material compositions having the same thicknesses and/or fiber orientations, or the layer(s) 16 on a multi-ply material roll 14c may be provided in different resin and fiber material compositions, thicknesses, and/or fiber orientations. The layer(s) 16 may be supported by a tension roller 26 for maintaining a predetermined level of tension in the layer 16 of fibrous material 18. A guide roller 28 may be provided for maintaining the layer 16 of fibrous material 18 at a desired orientation for feeding into the forming die set 50. For example, as shown in FIG. 2, the guide roller 28 may maintain the layer 16 of fibrous material 18 in alignment with the orientation of a gap 58 between upper and lower forming dies 52, 54 of the forming die set 50.

Figure 3:
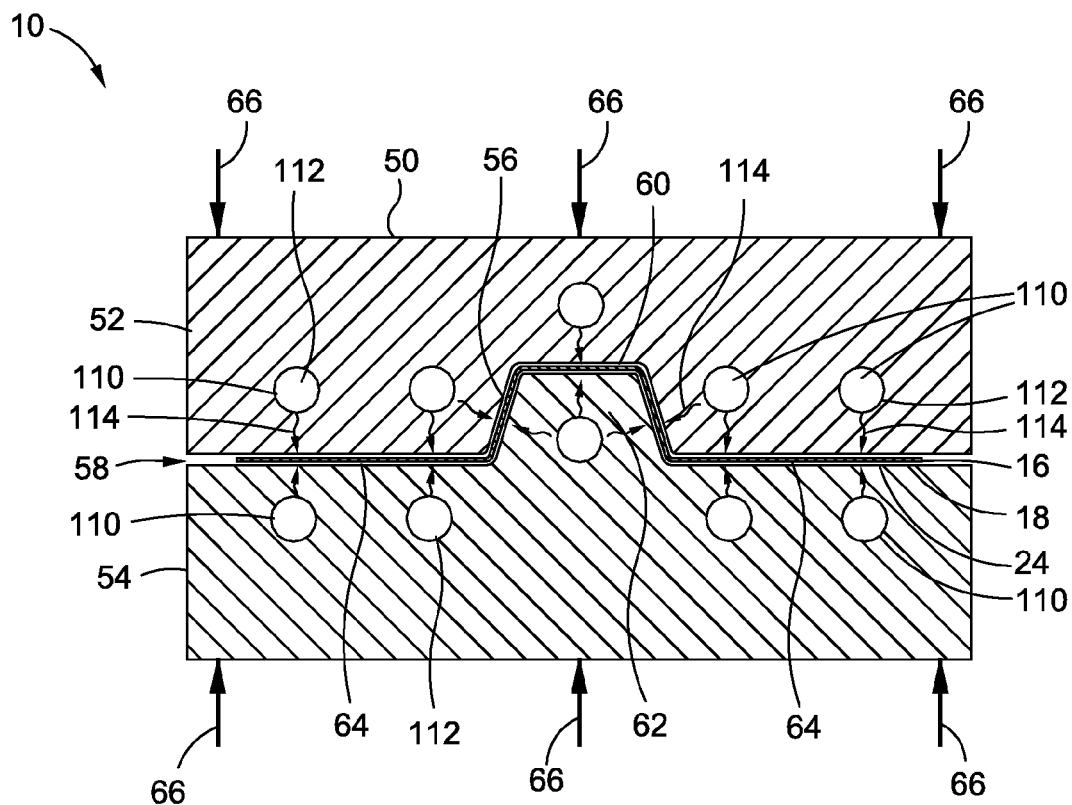
FIG. 3 is a cross-sectional view of an embodiment of the forming die set taken along line 3 of FIG. 2 and illustrating the layer of fibrous material disposed between upper and lower forming dies of the forming die set.

Referring to FIGS. 2-3, the forming die set 50 may comprise the upper and lower forming dies 52, 54. The gap 58 between the upper and lower forming dies 52, 54 may be larger than the thickness of the layer(s) 16 of fibrous material 18 at least at the entrance 76 to the forming die set 50 to allow the layer(s) 16 to enter the gap 58 and avoid bunching of the layer(s) 16 at the entrance 76. The gap 58 between the upper and lower forming dies 52, 54 may taper down gradually along a length of the forming die set 50. The upper and lower forming dies 52, 54 may be formed in the desired cross-sectional shape for forming the fibrous material 18 into the preform 200. In the embodiment shown, the cross sectional shape comprises a hat-section 204. The upper and lower forming dies 52, 54 may each include flats 64 for forming flanges 206 of the preform 200. The lower forming die 54 may include a protrusion 62 (FIG. 3) and the upper forming die 52 may include a groove 60 (FIG. 3) for receiving the protrusion 62.

In an embodiment, the gap 58 (FIG. 3) may be such that a predetermined amount of forming pressure 66 (FIG. 3) may be applied to the layer 16 (FIG. 3) of fibrous material 18 (FIG. 3) as the layer 16 of fibrous material 18 is pultruded through the forming die set 50 (FIG. 3). For example, the gap 58 may be sized such that a forming pressure 66 of up to approximately 150 psi or greater is applied to the layer 16 of fibrous material 18 although forming pressure 66 of less than 150 psi may be applied. The forming pressure 66 may also be such that resin 24 (FIG. 3) may flow between the structural fibers 20 (FIG. 2) to an extent that multiple layers 16 may be tacked together as described below. The resin 24 may be allowed to solidify such as may occur upon cooling of the resin 24 whereupon the solidified resin 24 maintains the preform 200 in the die cross-sectional shape 56.

Referring to FIG. 2, the forming die set 50 may have an entrance 76 and an exit 78. In an embodiment, the forming die set 50 may have a die cross-sectional shape 56 that may be generally constant (FIG. 2) or the cross-sectional shape may vary (FIG. 5) along the length of the forming die set 50 from the entrance 76 to the exit 78 as described below. The substantially constant die cross-sectional shape 56 may include a substantially constant gap 58 from the entrance 76 to the exit 78. However, the gap 58 that may vary along the length of the forming die set 50 from the entrance 76 to the exit 78. For example, in order to avoid bunching of the fibrous material 18 at the entrance 76, the gap 58 may be larger than the thickness of the layer(s) 16 at the entrance 76 and may narrow toward the exit 78 to provide a desired amount of forming pressure 66 on the layer(s) 16 as described below.

Figure 5:
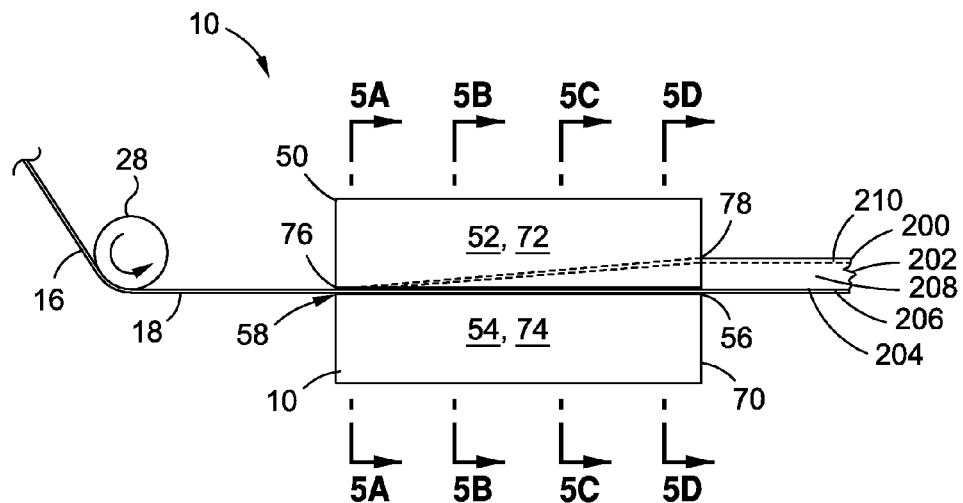
FIG. 5 is a side view illustration of the system in an alternative embodiment of the forming die set having a gradually changing die cross-sectional shape along a direction from an entrance to an exit of the forming die set.
Figure 5A:
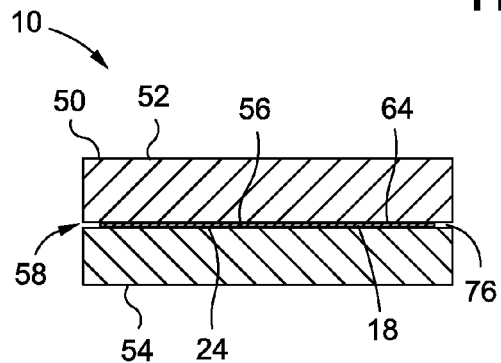
FIG. 5A is an illustration of a cross-section of the forming die set taken along line 5A of FIG. 5 and illustrating a generally planar die cross-sectional shape of the forming die set at the entrance thereto.
Figure 5B:
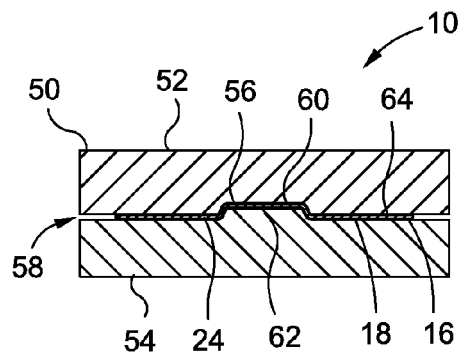
FIG. 5B is an illustration of a cross-section of the forming die set taken along line 5B of FIG. 5 and illustrating a protrusion and a groove formed at a relatively low height in the forming die set.
Figure 5C:
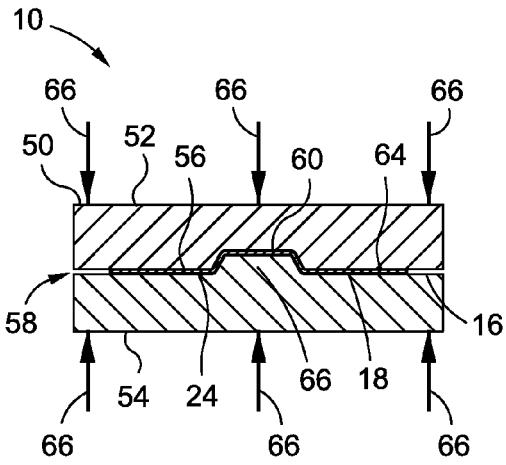
FIG. 5C is an illustration of a cross-section of the forming die set taken along line 5C of FIG. 5 and illustrating the protrusion and the groove having an increased height in the forming die set.
Figure 5D:
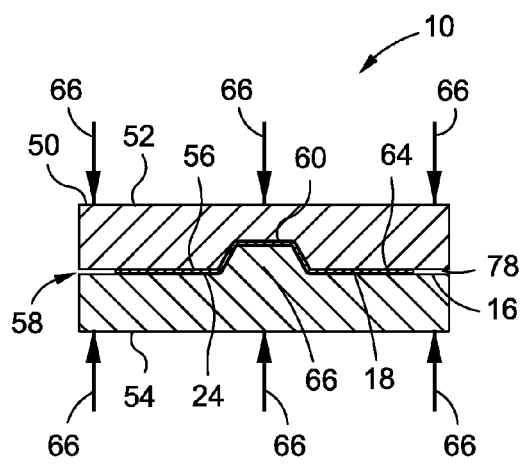
FIG. 5D is an illustration of a cross-section of the forming die set taken along line 5D of FIG. 5 and illustrating the protrusion and the groove formed at a full height at the exit of the forming die set.

Referring briefly to FIGS. 5-5D, shown in FIG. 5 is a side view of the forming die set 50 in an embodiment where the die cross-sectional shape 56 gradually transitions from a generally planar shape at the entrance 76 of the forming die set 50 to the full die cross-sectional shape 56 at the exit 78 of the forming die set 50. FIG. 5A illustrates a substantially planar die cross-sectional shape 56 of the forming die set 50 at the entrance 76. The size (e.g., height) of the gap 58 at the planar die cross-sectional shape 56 at the entrance 76 may be larger than a thickness of the fibrous material 18 entering the gap 58 at the entrance 76 to the forming die set 50 to avoid bunching of the fibrous material 18 at the entrance 76. FIG. 5B illustrates the protrusion 62 and the groove 60 formed in the forming die set 50 at a relatively low height as part of the gradual transition of the die cross-sectional shape 56 from the planar shape of the gap 58 at the entrance 76 (FIG. 5A) to the full die cross-sectional shape 56 at the exit 78 (FIG. 5D). In FIG. 5B, the size (e.g., height) of the gap 58 across the relatively low die cross-sectional shape 56 may be the same size as the gap 58 at the entrance 76 (FIG. 5A) or slightly smaller than the gap 58 at the entrance 76.

FIG. 5C illustrates the protrusion 62 and the groove 60 formed at an increased height in the forming die set 50. The size of the gap 58 may optionally be reduced in height relative to the size of the gap 58 at the entrance 76 (FIG. 5A) such that a forming pressure 66 (FIG. 5C) may be gradually applied to the fibrous material 18 as the fibrous material 18 moves through the forming die set 50 to gradually form the fibrous material 18 into the die cross-sectional shape 56. Although the forming pressure 66 is shown initially applied to the fibrous material 18 in FIG. 5C, the forming die set 50 may be configured such that the forming pressure 66 may be applied to the fibrous material 18 at any location along the length of the forming die set 50 from the entrance 76 (FIG. 5A) to the exit 78 (FIG. 5D) of the forming die set 50. FIG. 5D illustrates the protrusion 62 and the groove 60 formed at a full height of the die cross-sectional shape 56 at the exit 78 of the forming die set 50. The size of the gap 58 between the upper and lower forming dies 52, 54 in FIG. 5D may be such that the forming pressure 66 is maintained on the fibrous material 18 to form the fibrous material 18 into the final shape of the die cross-sectional shape 56. As indicated above, heat (not shown) may be applied to the fibrous material 18 at any location along a length of the forming die set 50.

Referring to FIGS. 2 and 5, as indicated above, the gap 58 between the upper and lower forming dies 52, 54 may be larger at the entrance 76 (FIGS. 2, 5, and 5A) than the size of the gap 58 at the exit 78 such that the forming pressure 66 (FIGS. 3, 5C, and 5D) on the layer 16 of fibrous material 18 may be gradually increased as the fibrous material 18 moves through the forming die set 50. In this manner, a reduced amount of pulling force may be required to pultrude the layer 16 of fibrous material 18 through the forming die set 50. In addition, a gradual transition to the final die cross-sectional shape 56 (FIG. 5D) may allow the resin 24 to be gradually heated as the layer 16 of fibrous material 18 contacts the upper and lower forming dies 52, 54 while passing through the forming die set 50 which may allow the fibrous material 18 to gradually conform to the die cross-sectional shape 56.

Figure 9:
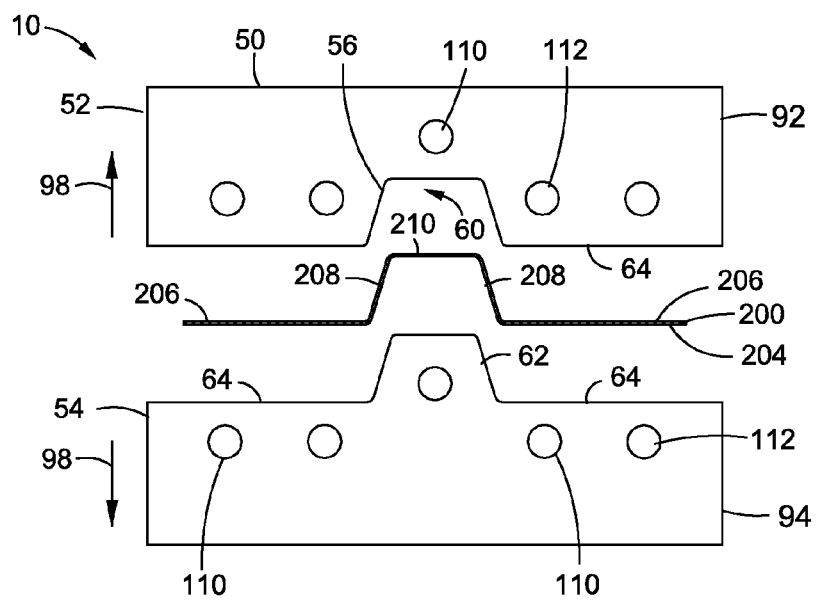
FIG. 9 is a cross-sectional view of the movable die set of FIG. 6 and illustrating separation of the upper die from the lower die and the layer of fibrous material being formed into a preform having a hat-section.

In a non-limiting embodiment, the preform 200 (FIG. 9) may be formed in a preform cross-sectional shape 202 (FIG. 9) of a hat-section 204 (FIG. 9) although the preform may be formed in any one of a wide variety of configurations, without limitation. The hat-section 204 may include pair of flanges 206 (FIG. 9) and a pair of webs 208 (FIG. 9) extending from the flanges 206 (FIG. 9) to a cap 210 (FIG. 9). The preform 200 may be consolidated or laminated with additional preforms (not shown), additional dry fibrous material 214 (FIG. 18), prepregs (not shown), and/or removable or permanent tooling (e.g., a mandrel 216) (FIG. 18) to create a continuous built-up preform 200 (FIG. 2) that may include different types of fibrous material 18 with different types of structural fibers 20 (FIG. 2) and different types of resin 24 (FIG. 2). The prepreg (not shown) may comprise fibrous material (not shown) pre-impregnated with matrix material (not shown) at a volume fraction in the range of from approximately 30 to 70 percent of total volume of the prepreg (not shown).

As distinguished from the relatively low volume fraction (e.g., 1 to 10 percent) of resin 24 (FIG. 1) used in the fibrous material 18 (FIG. 1) for maintaining the shape of the preform 200 (FIG. 18), the matrix material (not shown) used in the prepreg (not shown) and the matrix material 222 (FIG. 18) used for infusing the preform 200 (FIG. 18) may facilitate transfer of shear load between adjacent fibers. After assembling the preform 200 (FIG. 18) with additional fibrous material 214 (FIG. 18), the assembly may infused with matrix material 222 (FIG. 18) and cured to form a composite article 250 (FIG. 19). In this regard, the system 10 (FIG. 1) and method disclosed herein may facilitate the fabrication of preforms 200 (FIG. 18) having any cross-sectional shape for optional assembly with one or more composite components such as any number of additional preforms 200 or additional fibrous materials 214 (FIG. 18). The preform(s) 200 (FIG. 18) and/or the additional fibrous materials 214 may be infused with matrix material 222 (FIG. 18) followed by curing to form a final composite article 250 of any size, shape, and configuration.

Referring to FIG. 3, the system 10 may include a heating device 110 for heating the resin 24 as the layer 16 of fibrous material 18 passes through the forming die set 50. In the embodiment shown, the heating device 110 may comprise one or more heating coils 112 that may be integrated into or otherwise mounted to the upper forming die 52 and/or lower forming die 54. The heating device 110 may be configured to heat the resin 24 to a viscosity level that promotes flowing of the resin 24 such as between structural fibers 20 (FIG. 1) of the fibrous material 18. In an embodiment, the heating device 110 may be configured to heat the resin 24 at least up to the approximate melting temperature or glass-transition temperature of the resin 24 while the layer 16 of fibrous material 18 passes through the forming die set 50 to cause the resin 24 to at least partially soften.

In FIG. 3, in an embodiment, the heating coils 112 may be arranged to provide a substantially uniform distribution of heat 114 across the layer 16 of fibrous material 18. The heating coils 112 may be configured to heat the upper and lower forming dies 52, 54 such that the layer 16 of fibrous material 18 may be conductively heated due to contact with the upper and/or lower forming dies 52, 54. Although the heating coils 112 are shown extending along a length of the upper and lower forming dies 52, 54, the heating coils 112 may be arranged or mounted to the upper and/or lower forming dies 52, 54 in any one of a variety of alternative arrangements. In a further embodiment, the heating device 110 may be configured to heat the resin 24 by radiation heating of the resin 24. For example, although not shown, the heating device 110 may be configured to heat the resin 24 by using radiation having a frequency band that may be tuned to heat the resin 24 in the fibrous material 18 to a greater extent than the heating of the structural fibers 20 (FIG. 1) in the fibrous material 18.

In a further embodiment, the upper and/or lower forming die 52, 54 (FIG. 3) may be comprised of ferromagnetic material (not shown) that may be selected based on the Curie temperate of the ferromagnetic material that approximates the melting temperature, glass-transition temperature, or other desired temperature of the resin 24 (FIG. 3) in the layer 16 (FIG. 3) of fibrous material 18 (FIG. 3). In such an arrangement, the ferromagnetic material in the upper and/or lower forming die 52, 54 may be inductively heated by a magnetic field (not shown) that may be generated by an electrical current (not shown) flowing through one or more induction coils (not shown) that may be mounted adjacent to the upper and/or lower forming die 52, 54. The upper and/or lower forming die 52, 54 may be inductively heated to an equilibrium temperature that may approach the Curie temperature of the ferromagnetic material. The layer 16 of fibrous material 18 may be conductively heated due to thermal contact with the upper and/or lower forming die 52, 54. As the temperature of the upper and/or lower forming die 52, 54 approaches the Curie temperature, the magnetic properties of the ferromagnetic material may start to decay which may result in a reduction in the inductive heating of the upper and/or lower forming die 52, 54 and a reduction in the conductive heating of the layer 16 of fibrous material 18 in contact with the upper and/or lower forming die 52, 54. Portions of the upper and/or lower forming die 52, 54 that are at the equilibrium temperature may become non-magnetic such that the flow of induction current in the induction coil automatically diminishes to a level sufficient to stabilize the temperature of the layer 16 of fibrous material 18 at the desired temperature such as the melting temperature or the glass-transition temperature of the thermoplastic resin 24.

However, the heating device 110 (FIG. 3) may be provided in a variety of configurations and is not limited to heating the resin 24 (FIG. 3) using conductive heating, radiation heating, or inductive heating. Furthermore, although the heating device 110 is shown as being integrated into the forming die set 50 (FIG. 3), the heating device 110 may be provided as a separate component from the forming die set 50 and which may be mounted at any location such as upstream of the forming die set 50 near the entrance 76 (FIG. 2) and/or downstream of the forming die set 50 near the exit 78 (FIG. 2). Alternatively, one or more of the material rolls 14 (FIG. 1) may be heated in order to elevate the temperate of the resin 24 (FIG. 1) in the layers 16 (FIG. 1) on the material roll 14. In a further embodiment, one or more of the material rolls 14 (FIG. 1) may be refrigerated (not shown) such that the fibrous material 18 (FIG. 1) on the material rolls 14 is provided at a reduced temperature wherein the layers 16 have substantially no tack or a reduced amount of tack. The material roll 14 may be heated in order to elevate the temperature of the resin 24 to tackify the layer(s) 16 together and promote adhesion with adjacent layers 16 and/or adhesion between adjacent fibers 20 (FIG. 1) within a given layer 16 in a manner as is described above. In such an embodiment, the forming die set 50 (FIG. 1) may optionally be heated or non-heated.

Referring to FIG. 2, the forming die set 50 may optionally include a cooling device 130 for reducing the temperature of the resin 24 in the fibrous material 18. In an embodiment, the cooling device 130 may be integrated into or otherwise mounted to the upper and/or lower forming die 54 of the forming die set 50. The cooling device 130 may also be located downstream of the heating device 110 as shown in FIG. 10 and described below. In FIG. 2, the cooling device 130 may provide a means for drawing heat (not shown) away from the layer 16 of fibrous material 18 to allow the resin 24 to cool and solidify in a manner such that the preform 200 retains the die cross-sectional shape 56. In an embodiment, the cooling device 130 may provide a means for reducing the temperature of the resin 24 below the glass-transition temperature while the forming die set 50 includes the die cross-sectional shape 56. The forming pressure 66 (FIG. 3) on the layer 16 may form the preform 200 into the die cross-sectional shape 56 as the resin 24 cools. In an embodiment, the cooling device 130 may include one or more conduits (not shown) for circulating a cooling medium (not shown) such as any suitable liquid (e.g., water) through the upper and/or lower forming die 54. The cooling medium may draw heat (not shown) away from a portion of the upper and/or lower forming die 54 which may allow the resin 24 to cool.

Figure 4:
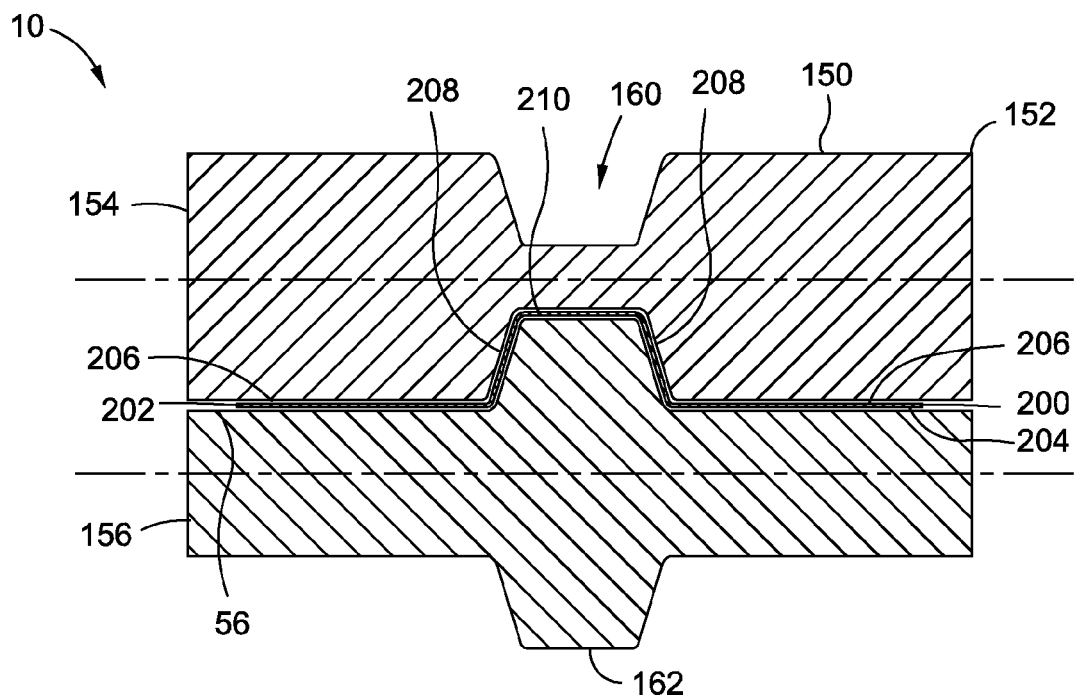
FIG. 4 is a cross-sectional view of an embodiment of the pulling mechanism taken along line 4 of FIG. 2 and illustrating the layer of fibrous material disposed between upper and lower rollers of the pulling mechanism.

Referring to FIGS. 1, 2 and 4, the system 10 (FIG. 1) may include a pulling mechanism 150 (FIG. 4) located downstream of the forming die set 50 (FIG. 1) and configured to draw or pultrude the layer 16 (FIG. 1) of fibrous material 18 (FIG. 1) through the forming die set 50. In the embodiment shown, the pulling mechanism 150 may include one or more pulling rollers 152 (FIG. 2) such as upper and lower roller 154, 156 (FIG. 2) mounted on opposite sides of the layer 16 (FIG. 2) of fibrous material 18 (FIG. 2) and being rotatable along respective rotational directions 154a, 156a (FIG. 2) about respective rotational axes. The upper roller 154 may include a circumferential groove 160 (FIG. 4) and the lower roller 156 may include a circumferential protrusion 162 (FIG. 4) that may be shaped complementary to the die cross-sectional shape 56. The pulling rollers 152 may clamp the fibrous material 18 and pultrude the layer 16 of fibrous material 18 from the forming die set 50. In an embodiment, the pulling rollers 152 may have a cross-sectional shape that is complementary to or substantially equivalent to the die cross-sectional shape 56.

The pulling mechanism 150 (FIG. 1) may optionally comprise a plurality of generally cylindrically shaped rollers (not shown) that may be mounted on opposite sides of the layer 16 (FIG. 1) of fibrous material 18 (FIG. 1) for clamping the different sections of the preform cross-sectional shape 202 (FIG. 13) between the rollers. The rollers may be distributed across the width of the layer 16 of fibrous material 18 and positioned such that a substantially uniform distribution of pulling force is applied to the width of the layer 16 of fibrous material 18. By configuring the pulling mechanism 150 such that a substantially uniformly distributed pulling force is applied, the relative orientation of the structural fibers 20 (FIG. 1) may be left undistorted or undisturbed as compared to distortion that may occur in the structural fibers 20 if a non-uniform pulling force were applied across a width of the layer 16. For example, the orientation of the structural fibers 20 in certain types of fibrous material 18 such as woven fabric may be maintained in substantially the same fiber orientation in the preform 200 (FIG. 1) as the fiber orientation on the material roll 14. Although FIG. 4 illustrates a single upper roller 152 and a single lower roller 154, any number of rollers may be provided and at any location along the width of the layer 16. Even further, although FIG. 2 illustrates a single pulling mechanism 150, any number of pulling mechanisms 150 may be provided and at any location along a length of the preform 200.

Referring to FIG. 2, the upper and lower forming dies 52, 54 may be configured to be generally fixed in position or may be generally stationary relative to one another and relative to the layer 16 of fibrous material 18 passing through the forming die set 50. For example, FIG. 2 illustrates the forming die set 50 70 comprised of upper and lower stationary dies 72, 74 that are generally fixed in position relative to one another. In this regard, the upper and lower stationary dies 72, 74 may be fixed or stationary relative to one another in the sense that the upper and/or lower stationary dies 72, 74 are non-movable when the layer 16 of fibrous material 18 is being drawn through the forming die set 50. However, either one of the upper and lower stationary dies 72, 74 may be adjustable relative to the opposing one of the upper and lower stationary dies 72, 74 such that the gap 58 therebetween may be adjusted to accommodate different thicknesses and/or quantities of layers 16 of fibrous material 18 and/or to adjust the magnitude of the forming pressure 66 (FIG. 3) applied to the layer 16 of fibrous material 18 by the upper and lower stationary dies 72, 74.

Figure 6:
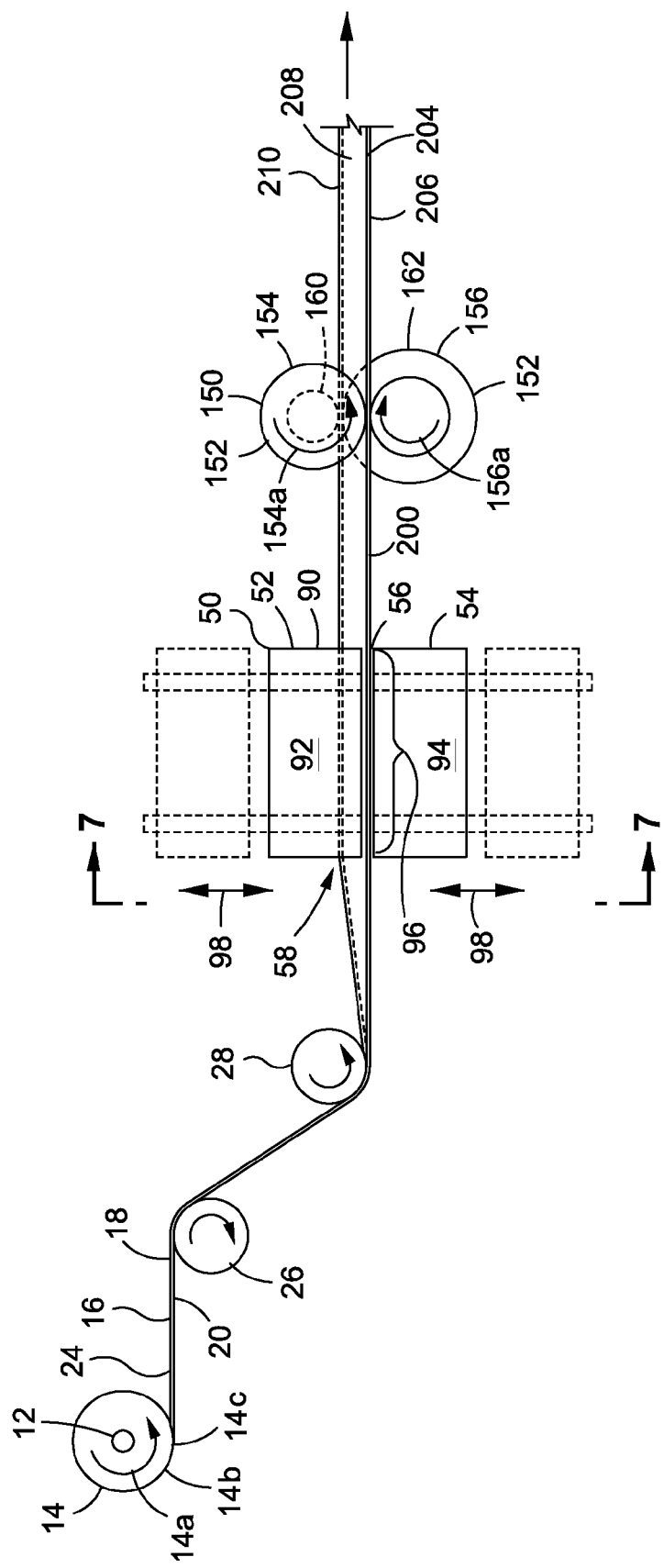
FIG. 6 is a side view illustration of an embodiment of the system having a movable die set for sequentially forming the die cross-sectional shape into successive sections of the length of the layer.

Referring to FIGS. 6-9, shown is an alternative embodiment of the forming die set 50 (FIG. 6) configured as a movable die set 90 (FIG. 6) for successively forming sections of the layer(s) 16 (FIG. 6). The movable die set 90 may include upper and lower movable dies 92, 94 (FIG. 6) that may be movable along the direction of movement 98 (e.g., vertically—FIG. 6) as shown in FIG. 6. The movement of the upper and lower movable dies 92, 94 may facilitate the successive clamping of sections of the length of fibrous material 18 to impart the die cross-sectional shape 56 into the layer 16 of fibrous material 18. In addition, the movable die set 90 may accommodate different thicknesses and/or quantities of layer(s) 16 of the fibrous material 18.

Figure 7:
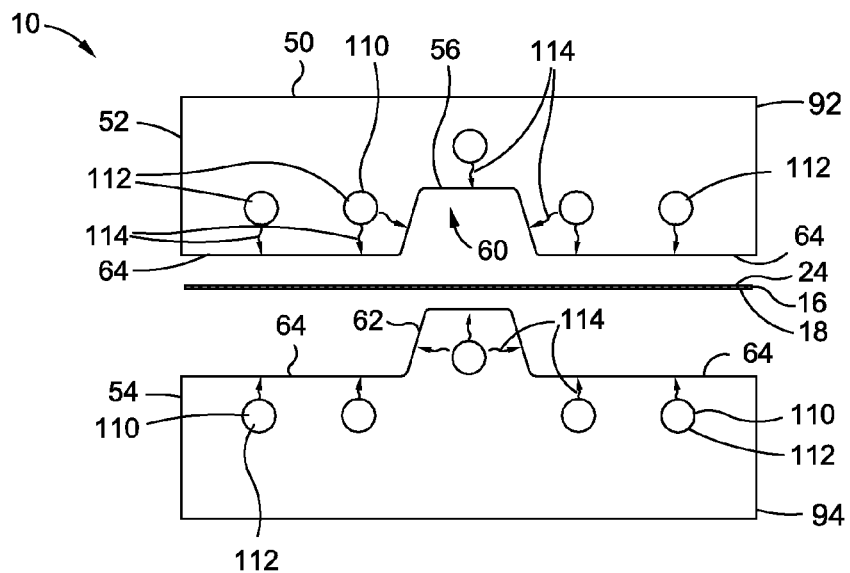
FIG. 7 is a cross-sectional view of an embodiment of the movable die set taken along line 7 of FIG. 6 and illustrating an upper movable die disposed in spaced relation to a lower movable die and the layer of fibrous material disposed therebetween.

In FIG. 7, the upper and lower movable dies 92, 94 may be separated such that one or more layers 16 of fibrous material 18 may be successively advanced through the forming die set 50. For example, a layer 16 may be advanced by activating the pulling mechanism 150 (FIG. 6) until a section 96 (FIG. 6) of the layer 16 is positioned within the gap 58 between the upper and lower movable dies 92, 94. The pulling mechanism 150 may be deactivated and heat 114 may optionally be applied to the upper and/or lower movable dies 92, 94 by means of a heating device 110.

Figure 8:
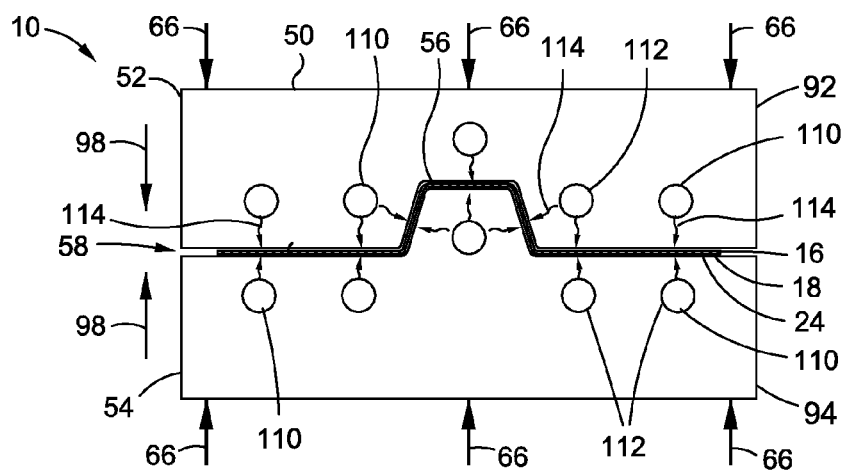
FIG. 8 is a cross-sectional view of the movable die set of FIG. 6 and illustrating the layer of fibrous material assuming the die cross-sectional shape during clamping of the layer between the upper and lower movable die.

In FIG. 8, the upper and lower movable dies 92, 94 may be moved toward one another to clamp the layer 16 of fibrous material 18 therebetween. The layer 16 may be conductively heated as a result of contact with the upper and lower movable dies 92, 94 or by radiative and/or inductive heating means as described above. Forming pressure 66 may be applied to the layer 16 while the temperature of the resin 24 is increased up to the approximate melting point or glass-transition temperature. The temperature and/or forming pressure 66 may be maintained for a predetermined period of time. The application of heat 114 may be discontinued and an optional cooling device 130 (FIG. 1) may be activated to draw heat (not shown) from the upper and lower movable dies 92, 94 to reduce the temperature of the resin 24 below the melting point.

In FIG. 9, upon cooling and/or solidifying of the resin 24 (FIG. 8), the resin 24 may harden and the upper and lower movable dies 92, 94 may be separated. When solidified, the resin 24 may stabilize the fibrous material 18 (FIG. 8) into the die cross-sectional shape 56 as shown. The pulling mechanism 150 (FIG. 6) may again be activated to draw another section 96 (FIG. 6) of the layer 16 (FIG. 6) into the gap 58 (FIG. 6) between the upper and lower movable dies 92, 94. The process may be repeated until a desired length of preform 200 is formed with the die cross-sectional shape 56.

Referring to FIG. 10, shown is an embodiment of the system 10 including a cooling device 130 located downstream of the forming die set 50. In an embodiment, the cooling may comprise a cooling die set 132 including upper and lower cooling dies 134, 136 that may have a cross-sectional shape that may be substantially similar to the die cross-sectional shape 56 (FIG. 9). In an embodiment, the cooling die 132 may be configured to act as a heat sink for drawing heat out of the layer 16 of fibrous material 18 after the preform 200 exit 78 the forming die set 50. The cooling die set 132 may be configured to passively cool the layer 16 of fibrous material 18 by providing a relatively large thermal mass for conducting heat out of the layer 16 due to contact of the layer 16 with the surfaces of the cooling die set 132.

Alternatively, the cooling device 130 (FIG. 10) may be configured to actively cool the layer 16 (FIG. 10) of fibrous material 18 (FIG. 10) using a cooling medium (not shown) that may be circulated through the cooling device 130 in a manner similar to the circulation of cooling medium through a portion of the forming die set 50 (FIG. 10) as described above. The cooling device 130 may be configured to reduce the temperature of the resin 24 (FIG. 10) in the layer 16 of fibrous material 18 (FIG. 10) to allow the resin 24 to cool below the glass-transition temperature and harden while the cooling device 130 maintains the layer 16 in the cross-sectional shape. The cooling device 130 may optionally be configured to maintain forming pressure 66 (FIG. 8) on the layer 16 until the temperature of the resin 24 is reduced to a predetermined level.

Referring to FIG. 11, shown is an embodiment of the system 10 having a laminating mechanism 170 located downstream of the forming die set 50. The laminating mechanism 170 may be configured to consolidate additional or subsequent layers 180 of fibrous material with the preform 200 to create a continuous built-up preform 200. The subsequent layer 180 of fibrous material may be the same type or a different type of fibrous material from which the preform 200 is initially created. In this regard, FIG. 11 illustrates a first material roll 40 including a first layer 40a of first fibrous material 40b for pultruding through the forming die set 50. A second material roll 42 includes a second layer 42a of second fibrous material 42b drawing from a spool 12 and passed over a tension roller 26 and/or guide roller 28. The second layer 42a may be joined to the first layer 40a and laminated together in the laminating mechanism 170.

In an embodiment, the laminating mechanism 170 (FIG. 11) may comprise a laminating die set 172 (FIG. 11) that may be configured similar to the above-described forming die set 50 illustrated in FIGS. 1-9. The laminating die set 172 may include upper and lower laminating dies 174, 176 (FIG. 11) having a laminating die cross-sectional shape 178 (FIG. 11) that may be substantially similar to the die cross-sectional shape 56 (FIG. 11) of the forming die set 50 (FIG. 11). The laminating die set 172 may be configured to accommodate the extra thickness of the second layer 42a (FIG. 11) and apply a laminating pressure 182 (FIG. 12) to the first and second layer 40a, 42a (FIG. 11) as the first and second layers 40a, 42a are pultruded through the laminating die set 172 by the pulling mechanism 150 (FIG. 11). The second layer 42a may be provided in any width and is not limited to having the same width as the first layer 40a. In addition, the second layer 42a may be applied to any portion of the preform 200 (FIG. 11).

Figure 12:
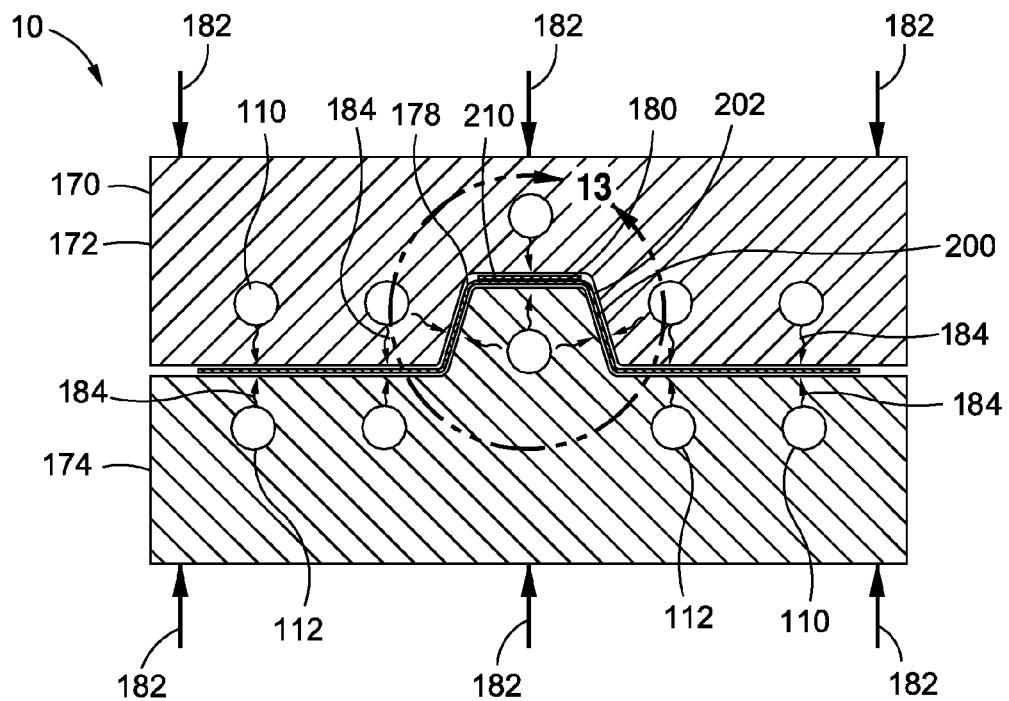
FIG. 12 is a cross-sectional view of the laminating die set taken along line 12 of FIG. 10 and illustrating the subsequent layer of fibrous material and the preform compressed between the upper and lower laminating dies.
Figure 13:
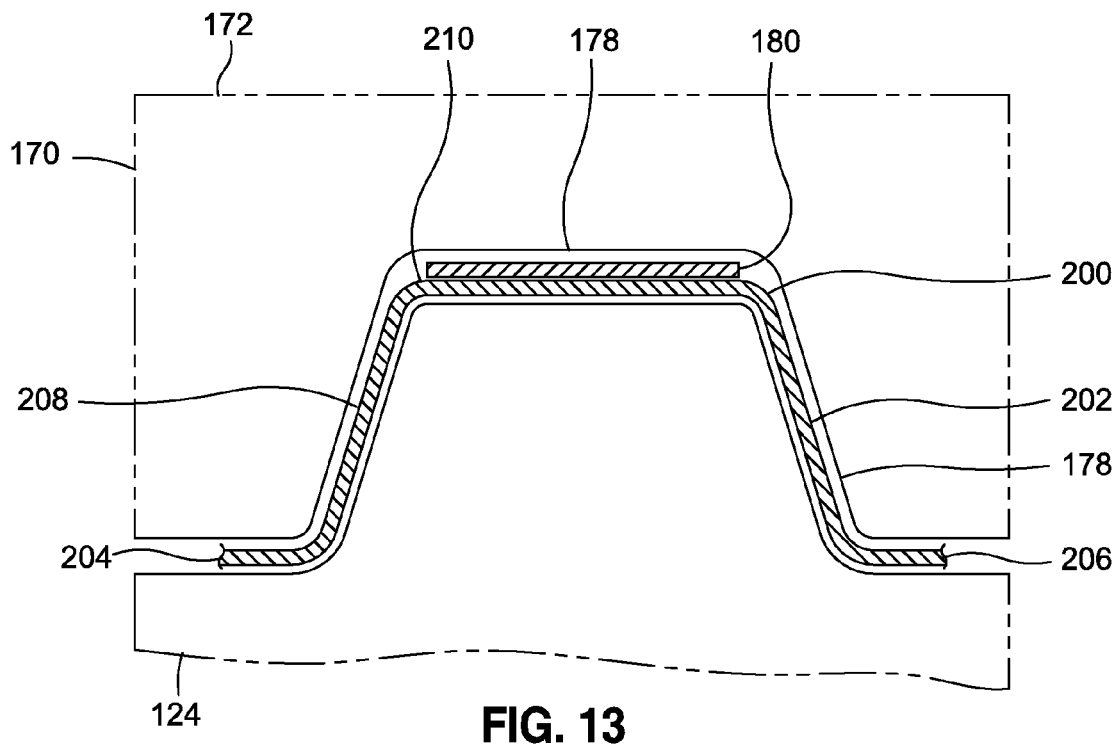
FIG. 13 is an enlarged cross-sectional view of the laminating die set taken along line 13 of FIG. 12 and illustrating the subsequent layer of fibrous material positioned over a cap of the preform between the upper and lower laminating dies.

Referring to FIGS. 12-13, shown is a cross-sectional view of the laminating mechanism 170 illustrating the second layer 42a being laminated or consolidated with the first layer 40a between the upper and lower laminating dies 174, 176 (FIG. 11). As shown in FIG. 13, the second layer 42a may be provided in a width that may extend across a width of a cap 210 of the preform 200. The upper and lower laminating dies 174, 176 may be configured to accommodate the additional thickness of the second layer 42a (FIG. 11) on the cap 210. Laminating pressure 182 and/or heat 184 may be applied to the first and second layers 40a, 42a to consolidate and/or join the first and second layers 40a, 42a (FIG. 11) to form a continuous preform 200. As may be appreciated, any number of additional layers of fibrous material 180, prepreg (not shown), or additional preforms (not shown) may be applied to any portion of the preform 200 shown in FIGS. 12-13.

Figure 14:
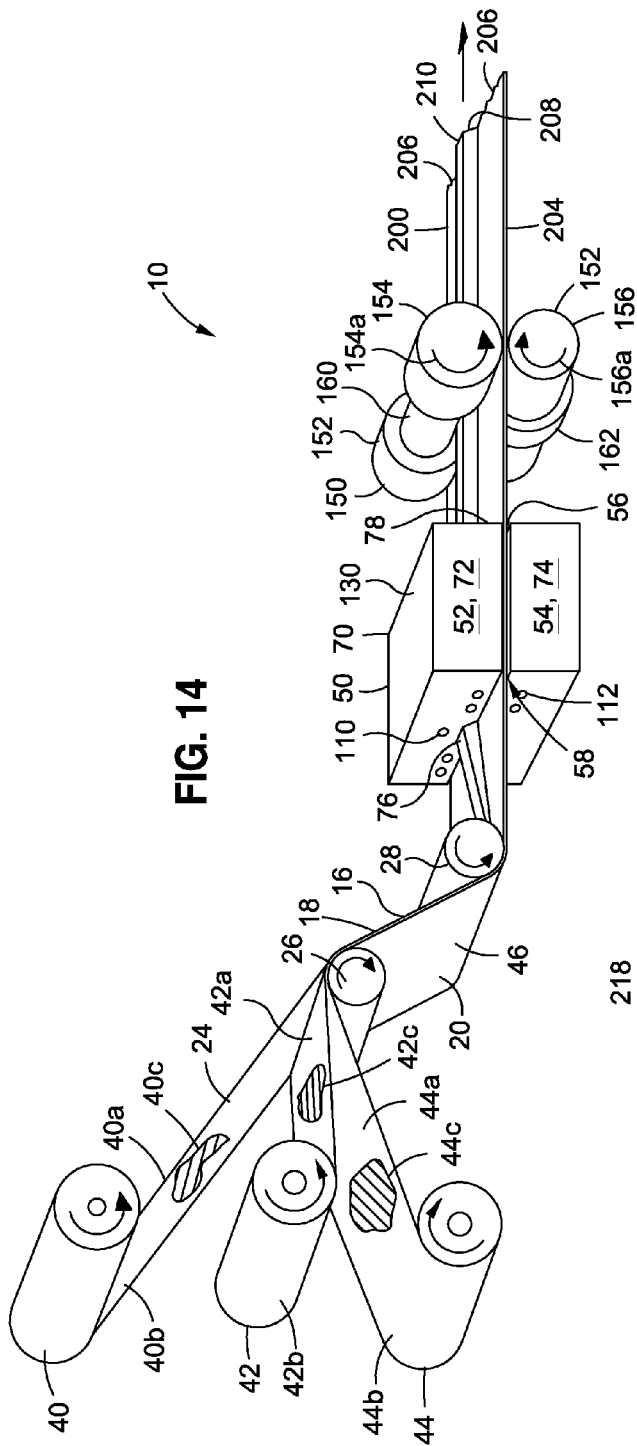
FIG. 14 is a perspective view illustration of an embodiment of the system having at least three layers of fibrous material assembled into a layer assembly for pultrusion through the forming die set for forming the die cross-sectional shape into the layer assembly.

Referring to FIG. 14, shown is an embodiment of the system 10 having a plurality of layers 16 of fibrous material 18 assembled together and drawn into the forming die set 50 for imparting the die cross-sectional shape 56 in the layer assembly 46. The layers 16 of fibrous material 18 may be formed of substantially similar material having substantially similar material compositions of the structural fibers 20 and resin 24. However, the fibrous material 18 in the layers 16 may be different. For example, in FIG. 14, shown is a first material roll 40 for dispensing one or more first layers 40a of a first fibrous material 40b, a second material roll 42 for dispensing one or more second layers 42a of a second fibrous material 42b, and a third material roll 44 for dispensing one or more third layers 44a of a third fibrous material 44b. The first, second, and third layers 40a, 42a, 44 may include the same type or structural fibers 20 having the same fiber material composition. Alternatively, the first, second, and third layers 40a, 42a, 44a may include different structural fibers 20 having different fiber material compositions.

In addition, the structural fibers 20 in the, second, and third layers 40a, 42a, 44a may have the same fiber orientation or different fiber orientations such as different fiber angles 22 (FIG. 1). For example, the first layer 40a may have fibers oriented at a first fiber angle 40c of +45 degrees, the second layer 42a may have fibers oriented at a second fiber angle 42c of 0 degrees, and the third layer 44a may have fibers oriented at a third fiber angle 44c of −45 degrees relative to a longitudinal axis (not shown) of the layer 40a. Furthermore, the first, second, and third layers 40a, 42a, 44a may include different types (i.e., different material compositions) of resin 24 or the same type of resin 24. In addition, the layers 40a, 42a, 44 may be provided in the same thicknesses or in different thicknesses. One or more of the material rolls 40, 42, 44, may comprise single-ply rolls (not shown) each containing a single layer of fibrous material (not shown). Alternatively, one or more of the material rolls 40, 42, 44, may be provided as a multi-ply roll (not shown) containing multiple layers of fibrous material having the same or different resin composition, fiber compositions, thicknesses, and/or fiber orientations as described above with regard.

In FIG. 14, two or more layers 16 of the fibrous material 18 may be assembled to form a layer assembly 46. The layer assembly 46 may be passed over a tension roller 26 and a guide roller 28 in a manner described above. The layer assembly 46 may be pultruded through a forming die set 50 by a pulling mechanism 150 such as the upper and lower rollers 154, 156 illustrated in FIG. 14 or a different type of pulling mechanism (not shown) may be used. Heat (not shown) and pressure (not shown) may be applied to the layer assembly 46 to soften and/or at least partially melt the resin 24 such that the layer assembly 46 may conform to the die cross-sectional shape 56 (FIG. 8) of the forming die set 50. The layer assembly 46 and resin 24 may solidify to form a stabilized preform 200 having the die cross-sectional shape 56. One or more subsequent layers of fibrous material (not shown) or prepreg (not shown) may be consolidated or laminated with the preform 200 in a manner as is described above to create a continuous built-up preform 200 having a desired cross-sectional shape. The preform 200 may be cut to length and trimmed following formation of the preform 200.

In an embodiment, after forming the preform 200 (FIG. 18) into the desired cross-sectional shape 202, the preform 200 may be thermoformed (not shown) or hot-drape-formed (not shown) in a secondary forming process to form the preform 200 into an additional shape prior to assembling the preform 200 with additional fibrous material 214 (FIG. 18) and prior to infusing the preform 200 with matrix material (FIG. 18). Thermoforming the preform 200 may comprise heating the preform 200 to soften the resin 24 (FIG. 1) while applying the heated preform 200 to a thermoforming tool (not shown) such that the preform 200 assumes the shape of the thermoforming tool. The preform 200 may be allowed to solidify while maintaining the preform 200 against the tool. The resin 24 in the preform 200 may cool and harden such that the preform 200 retains the thermoformed shape in addition to the previously-formed die cross-sectional shape 56 (FIG. 1). In this manner, a preform 200 having a desired cross-sectional shape may be formed into any one of a variety of additional shapes prior to assembly with other fibrous material 214 (FIG. 18) and prior to infusing the assembly with matrix material 222 (FIG. 18).

For example, the hat-section 204 preform 200 illustrated in FIG. 14 may be thermoformed into a slightly curved shape (not shown) along the length direction of the hat-section 204 preform 200. The curved shape may be complementary to a final shape (not shown) of a composite article to be formed using the preform 200. It should be noted that thermoforming of the preform 200 is not limited to thermoforming a curve into a length of the preform 200. For example, the preform 200 may be thermoformed into a twisting shape (not shown) along the length of the preform 200 or into any one of a variety of other shapes. Advantageously, the relatively low amount of resin 24 (FIG. 1) (e.g., up to approximately 10 percent) may maintain the preform 200 in the desired cross-sectional shape and the thermoformed shape which may simplify the laying up of a composite article. As indicated above, shape-stabilized preforms 200 formed in the manner described herein may significantly reduce the complexity and time associated with laying up composite articles by minimizing labor during the process of assembling the ply stack on a tool. In this manner, the preform 200 as disclosed herein may significantly reduce the amount of touch labor typically associated with conventional ply-by-ply layup of composite articles where a large portion of layup time is associated with positioning and maintaining the fibers of the fabric or tow in the desired orientation prior to and during vacuum bagging, autoclaving, and other processes associated with the infusion and curing of matrix material.

Figure 15:
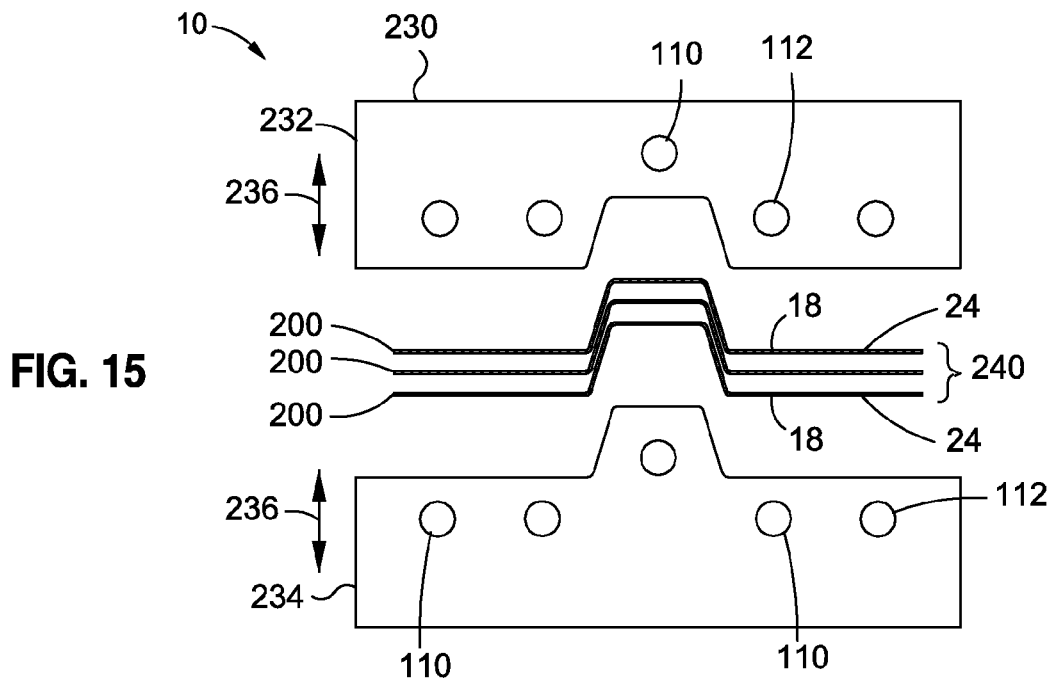
FIG. 15 is an illustration of a preform die set illustrating a preform upper die disposed in spaced relation to a preform lower die and a plurality of preforms disposed in a preform stack between the upper and lower preform die.

Referring to FIG. 15, shown is a preform die set 230 having upper and lower preform dies 232, 234 and illustrating a stack 240 of preforms 200 positioned between the upper and lower preform dies 232, 234. The preform die set 230 may include a heating device (not shown) of any configuration as described above to perform conductive, radiative, and/or inductive heating of the preform stack 240. The preform die set 230 may be configured similar to the forming die set 50 (FIG. 1) described above. The preforms 200 may be formed substantially similar to one another with regard to the cross-sectional shapes such that the preforms 200 may be nested with one another. As indicated above, the preforms 200 may be formed of the same or different resin 24 and/or fibrous material 18 compositions, thicknesses, and/or fiber orientations as described above.

The upper and/or lower preform dies 232, 234 of the preform die set 230 may be movable (e.g., vertically) relative to one another along a direction of movement 236 to successively clamp sections (not shown) of a length (not shown) of the preform stack 240 between the upper and lower preform dies 232, 234. Alternatively, the preform die set 230 may be stationary and may be configured to pultrude the preform stack 240 through a gap (not shown) between the upper and lower preform dies 232, 234 similar to the pultrusion described above for the stationary configuration of the forming die set 50 shown in FIGS. 1-2.

Figure 16:
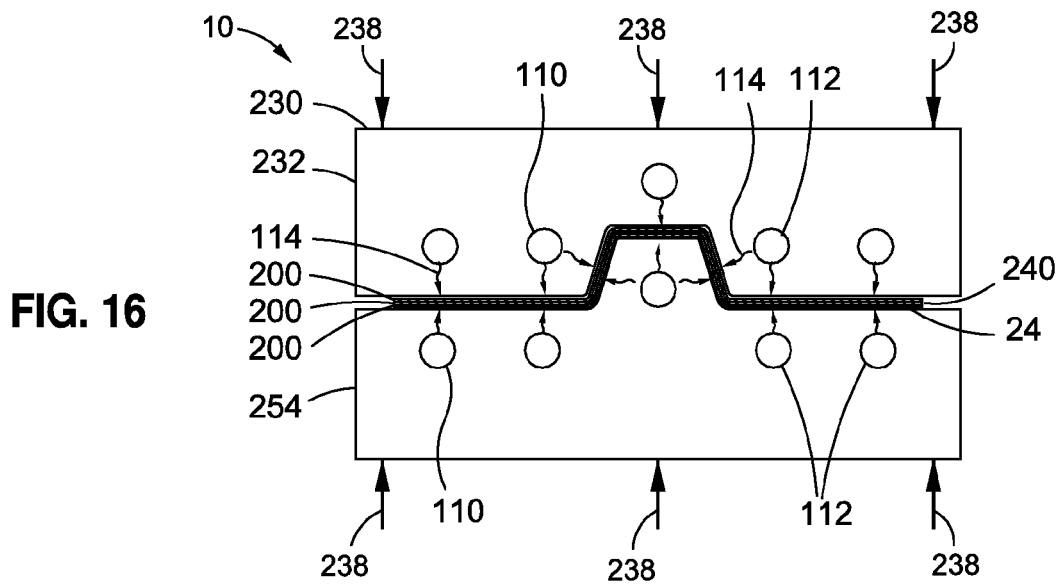
FIG. 16 is an illustration of the preform die set illustrating the application of heat and compressive force to the plurality of preforms during clamping thereof between the upper and lower preform die.

In FIG. 16, the upper and lower preform dies 232, 234 may be moved toward one another along the direction of movement 236 (FIG. 15) to clamp the preform stack 240. Heat (not shown) may be applied to the preform stack 240 using one or more heating devices 110 to heat the preform stack 240 to a temperature causing a reduction in the viscosity of the resin 24. The resin 24 may be heated to a temperature that approaches or exceeds the melting temperature of the resin 24 to allow the resin 24 to soften and/or reduce the viscosity thereof. The reduced viscosity of the resin 24 may promote intermingling of the resin 24 in the adjacent preforms 200. A compressive force 238 may additionally be applied to the preform stack 240 to facilitate the consolidation of the preforms 200 as described in greater detail below.

Figure 17:
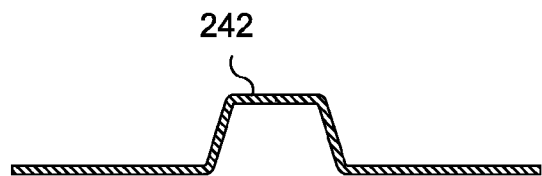
FIG. 17 is an illustration of a preform assembly formed from the preform stack using the preform die set.

In FIG. 17, a preform assembly 242 may be formed as a result of the application of heat and/or compressive force 238 (FIG. 16) to the preform stack 240 (FIG. 16). The preform assembly 242 may assume the cross-sectional shape of the preform die set 230 (FIG. 16) upon solidification of the resin 24 (FIG. 16). As described below, the preform assembly 242 may be combined with one or more composite components (not shown) such as additional fibrous material 214 (FIG. 18) and infused with matrix material 222 (FIG. 18). The matrix material 222 may be cured such that a composite component 250 (FIG. 19) may be formed as described below.

Referring to FIG. 18, shown is the preform 200 positioned or assembled with additional fibrous material 214. The additional layer 218 of fibrous material 214 may comprise other shape-stabilized preforms or substantially dry preforms (not shown), prepreg (not shown), and any one of a variety of other types of fibrous materials 214. As shown in FIG. 18, the hat-section 204 preform 200 may be assembled into a hat stringer 252 using a mandrel 216 that may be installed within the preform 200. The mandrel 216 may support the shape of the preform 200 during vacuum bagging and/or autoclaving and during infusion of matrix material 222. The mandrel 216 may comprise a temporary mandrel such as a removable bladder (not shown) or dissolvable foam (not shown). Alternatively, the mandrel 216 may comprise a permanent mandrel (not shown) such as a permanent foam mandrel or other tooling configured to be permanently retained within the hat stringer 252 or other closed cross-sectional shapes.

In FIG. 19, additional composite components (not shown) may be assembled with the preform 200. For example, a pair of noodles 272 (FIGS. 18-20) or other radius fillers may be installed to fill the space between the flanges 254 (FIG. 19), webs 256 (FIG. 19), and base laminate 264 (FIG. 19) of a hat stringer 252 (FIG. 19) formed using one or more preforms 200 as described below. The noodles 272 may be formed of unidirectional tow, woven fabric, fiber-reinforced adhesive, or other material for filling the radii between the mandrel 216 and the hat-section 204 preform 200. Additional layers 218 of material may be applied over the preform 200 to encapsulate the mandrel 216 and noodles 272. For example, a subsequent layer 218 of fibrous material 214 such as woven or unwoven fabric, organized tows, prepregs, or other substrates or materials may be applied in one or more layers 218 over the mandrel 216 and preform 200.

The preform 200 (FIG. 18) and the additional fibrous material 214 (FIG. 18) may then be infused with matrix material 222 (FIG. 18) followed by curing the matrix material 222 to form a single, unitary final composite article 250 (FIG. 19). The infusion of matrix material 222 may be by any suitable liquid-molding process and which may optionally include the application of heat and/or pressure to facilitate matrix infiltration and consolidation to form the composite article 250. For example, the preform 200 and the additional fibrous material 214 may be infused by resin transfer molding (RTM) wherein matrix material 222 may be infused under pressure into the preform 200 and other components within a closed mold. The preform 200 and the additional fibrous material 214 may also be infused using vacuum-assisted resin transfer molding (VARTM) using vacuum-generated pressure to infuse matrix material 222 (FIG. 19) into the preform 200 and the additional fibrous material 214. Resin film infusion (RFI) may also be implemented wherein a film of matrix material (not shown) may be positioned underneath or on top of the preform 200. Heat may be applied to reduce the viscosity of the matrix material film and promote infiltration thereof into the preform 200. Additional infusion processes may be employed for infusing and impregnating the structural fibers 20 (FIG. 11) of the preform 200 with matrix material 222.

In an embodiment, the matrix material 222 (FIG. 18) may comprise a thermosetting resin or a thermoplastic matrix material which may have a composition that may be chemically compatible with the resin 24 (FIG. 18) in the preform 200 (FIG. 19). In an embodiment, the matrix material 222 may comprise any one of the following materials: epoxies, bismaleimides, phenolics, polyesters, polyimides, polyurethanes, polybenzoxazoles, cyanate esters, polyetheramides, and other matrix material 222. In addition, the matrix material 222 may optionally comprise thermoplastic resin 24 which may be the same or different than the resin 24 that may be included with the layer 16 (FIG. 11) of fibrous material 18 (FIG. 11).

The resin 24 (FIG. 18) provided with the layer 16 (FIG. 1) of fibrous material 18 (FIG. 18) is preferably chemically compatible with the matrix material 222 (FIG. 18) and may have one or more compatible characteristics when in the presence of the matrix material 222. For example, the resin 24 provided with the layer 16 of fibrous material 18 may be at least partially soluble in the matrix material 222 which may comprise thermosetting matrix material. Alternatively, the resin 24 provided with the layer 16 of fibrous material 18 may be completely soluble in the matrix material 222. Even further, the resin 24 provided with the layer 16 of fibrous material 18 may be chemically reactive with the matrix material 222. In a further embodiment, the resin 24 provided with the layer 16 of fibrous material 18 may remain in a phase that is different than the phase of the matrix material 222 when the resin 24 comes into contact with the matrix material 222. Preferably, the resin 24 provided with the layer 16 of fibrous material 18 may avoid or prevent microcracking in the infused and cured composite article 250 (FIG. 19) at the locations where the matrix material 222 interfaces with the resin 24.

Figure 20:
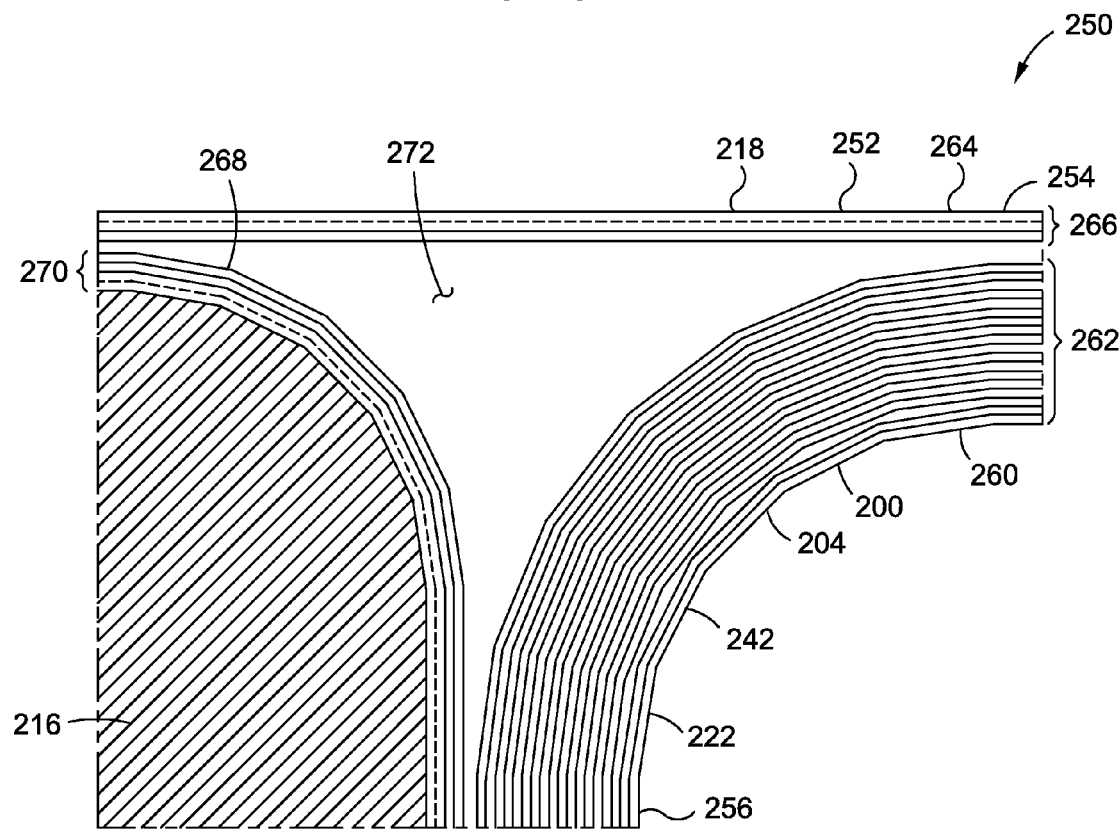
FIG. 20 is a cross-sectional view of a portion of the hat-section stringer and the preform and plurality of layers of fibrous material that may make up the hat-section stringer.

Referring to FIGS. 19-20, shown is a hat stringer 252 that may include one or more of the hat-section 204 preforms 200. In FIG. 20, one or more of the hat-section 204 preforms 200 may be combined to form a primary laminate 260 of the hat stringer 252. The primary laminate 260 may be comprised of a plurality of primary plies 262, one or more of which may be formed as a shape-stabilized preform 200 as described above. The hat stringer 252 may also include a base laminate 264 comprised of a plurality of base plies 266 (FIG. 20), one or more of which may also be formed as a shape-stabilized (e.g., planar) preform 200. Alternatively, the base laminate 264 may be formed by applying fibrous material 18 from a material roll 14 (FIG. 18) as illustrated in FIG. 18.

In FIG. 19, the hat stringer 252 may also include a wrap laminate 268 including wrap plies 270 (FIG. 20) and forming a closed section that may optionally be supported by a mandrel 216 (FIG. 20). The wrap plies 270 of the wrap laminate 268 may be formed as one or more preforms 200 in manner similar to the forming of the hat-section 204 preforms 200 for the primary laminate 260 of the hat stringer 252. The wrap plies 270 may be tackified by providing the resin 24 for the wrap ply preform (not shown) in a composition that tackifies upon the application of heat (not shown) such that the wrap plies 270 are formed in a cross-sectional shape that may be applied to the mandrel 216. However, the resin 24 may also have properties that cause the resin 24 to tackify upon the removal of heat such that a preform 200 (FIG. 1) may retain a die cross-sectional shape 56 (FIG. 1) as the resin 24 solidifies while the level of tack increases with decreasing temperature as mentioned above. As described above, the mandrel 216 may support the closed cross-sectional shape of the hat stringer 252 during vacuum bagging, autoclaving, and/or infusion of matrix material 222. In FIG. 20, one or more noodles 272 or radius fillers may be included with the hat stringer 252 (FIG. 19) to fill the space between the intersections of the flanges 254 and webs 256 due to the radii of the flanges 254 and the webs 256 which are joined with the base laminate 264.

Figure 21:
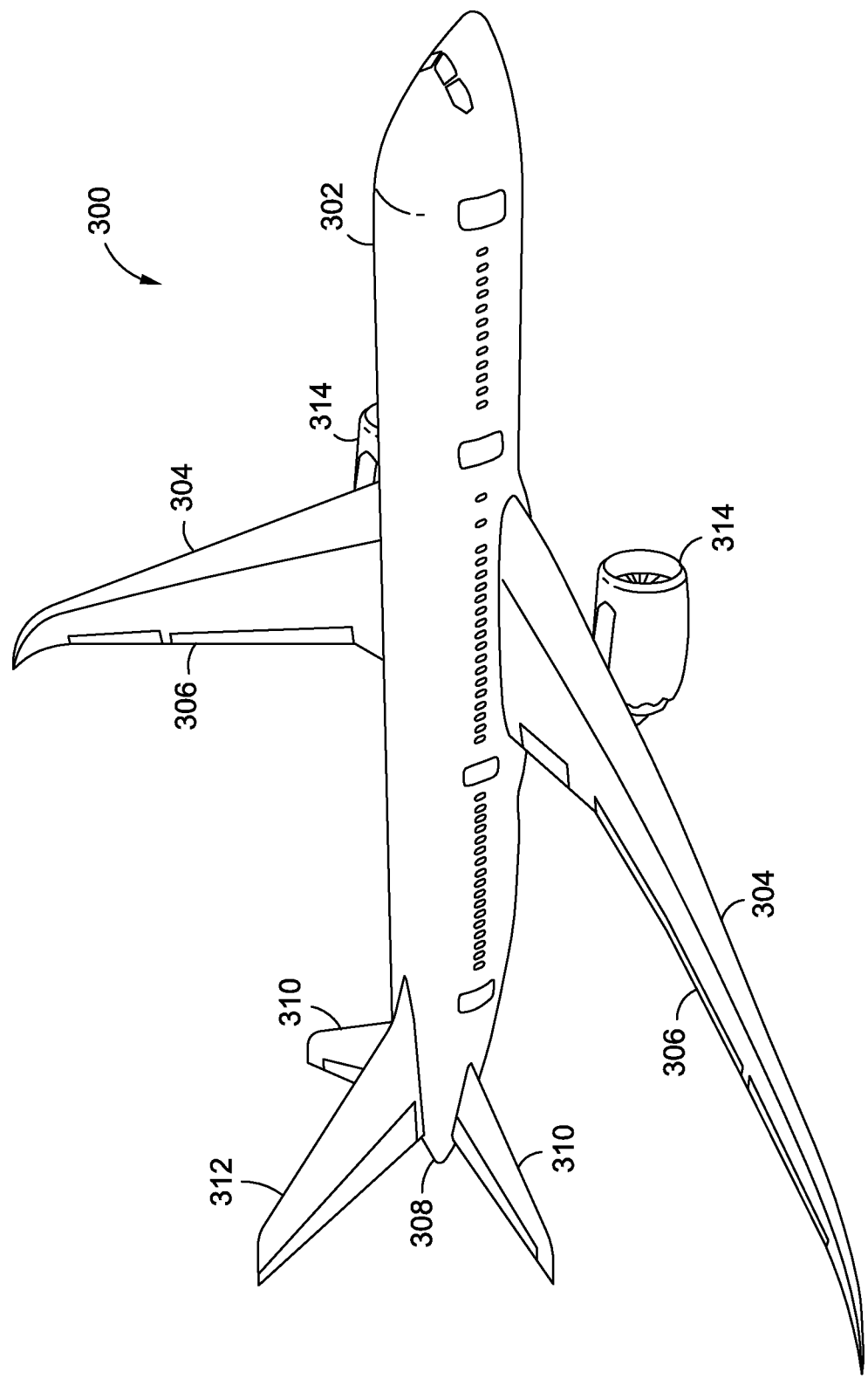
FIG. 21 is a perspective illustration of an aircraft for which composite articles may be formed using the system and method disclosed herein.

Referring to FIG. 21, shown is a perspective illustration of an aircraft 300 which may incorporate articles formed using one or more shape-stabilized preforms 200 (FIG. 19) as disclosed herein. The aircraft 300 may comprise a fuselage 302 having a pair of wings 304 and having a tail section 308 which may include a vertical stabilizer 312 and horizontal stabilizers 310 and which may further include control surfaces 306 and propulsion units 314. The aircraft 300 may be generally representative of one of a variety of vehicles that may incorporate the preform 200 as described herein. In this regard, the preform 200 may be incorporated into any structural system, structural subsystem, structural assembly, structure, or vehicle including any air vehicle and/or space vehicle. For example, in the context of the aircraft 300, the preform 200 may be incorporated into an internal and/or external component of the aircraft such as into the wings 304 such as in a wing panel, a wing skin, a wing spar, a wing rib, an aileron, a control surface 306, a support structure, and in other components. The preform 200 may also be incorporated into a component of the fuselage 302 such as component of a fuselage skin, a fuselage bulkhead, a frame, a stringer such as a hat stringer 252 (FIG. 19), and other components.

Figure 22:
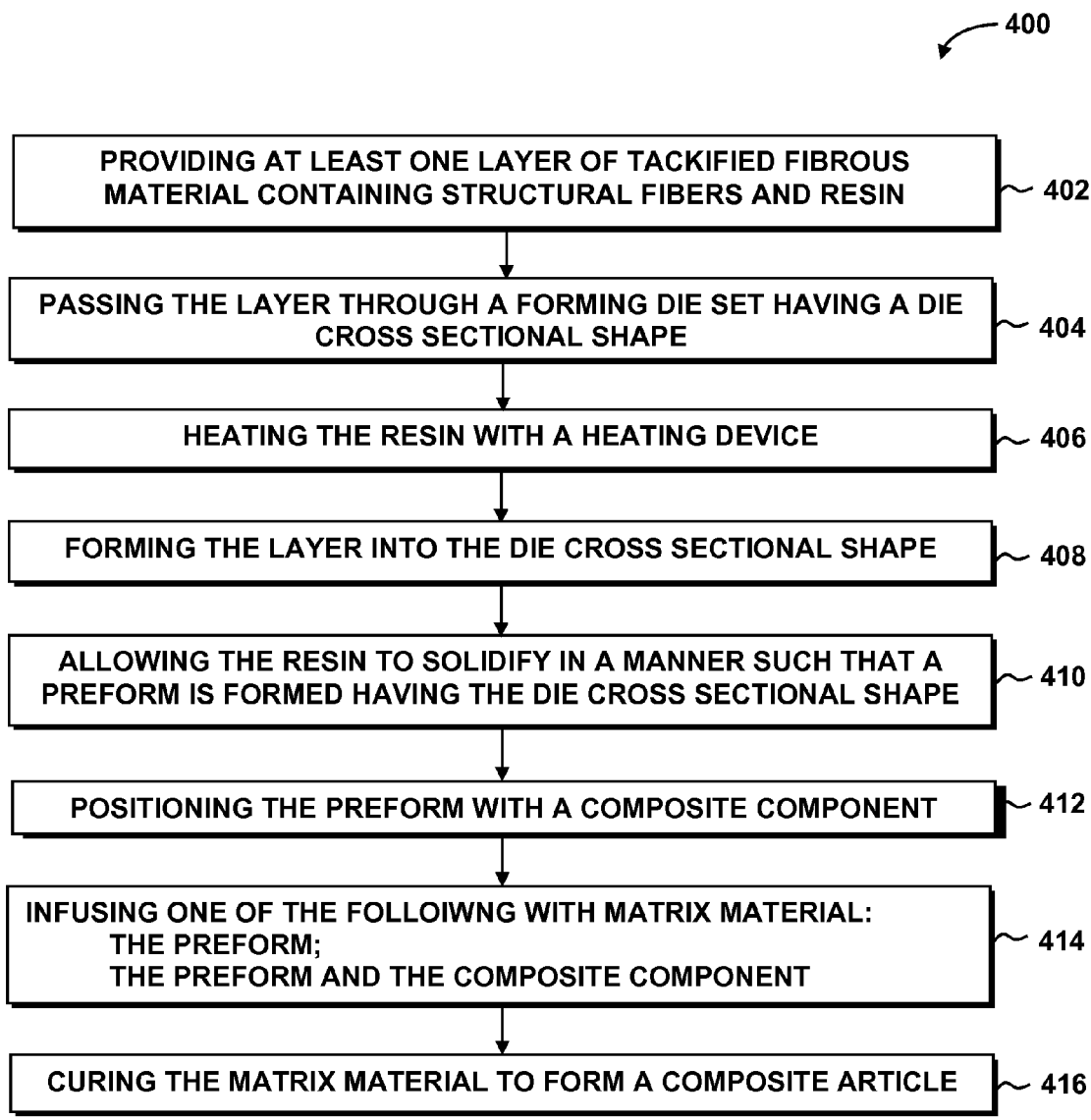
FIG. 22 is a flow diagram illustrating one or more operations that may be included in a method of forming a composite article.

Referring to FIG. 22, shown is a flowchart illustrating one or more operations that may be included in a method 400 of forming a composite article 250. The method may include steps for forming a shape-stabilized preform 200 as may be incorporated into the composite article 250 (FIG. 19).

Step 402 of the method 400 of FIG. 22 may comprise providing at least one layer 16 (FIG. 1) of fibrous material 18 (FIG. 1) containing structural fibers 20 (FIG. 1). In an embodiment, the layer 16 of fibrous material 18 may contain an amount of thermoplastic or thermosetting resin 24 (FIG. 1) sufficient to form the preform 200 (FIG. 1) in a die cross-sectional shape 56 (FIG. 1) as described above and/or to tackify multiple layer(s) 16 of the preform 200 together as described above. In an embodiment, the layer(s) 16 of fibrous material 18 may include up to approximately 10 percent by volume of resin 24 (FIG. 1) relative to the total volume of the layer 16. In an embodiment, the layer(s) 16 of fibrous material 18 may include approximately 10 percent by volume or less of resin. The resin 24 may comprise thermoplastic resin or thermosetting resin. In an embodiment, the layer 16 of fibrous material 18 may contain a relatively small amount of resin 24. For example, the layer 16 (FIG. 1) of fibrous material 18 may contain between approximately 2 to 4 percent by volume of resin 24 relative to the total volume of the layer 16. The fibrous material 18 and the resin 24 may be provided in any one of a variety of different material composition, thicknesses, and fiber orientations as described above.

The resin 24 (FIG. 1) may be pre-applied to the fibrous material 18 (FIG. 1) by any suitable means such as by using a roller (not shown), a brush (not shown), a sprayer (not shown), or any one of a variety of other resin application methods, without limitation. The resin 24 may be heated prior to application to reduce the viscosity thereof. In an embodiment, the resin 24 may be pre-applied to the layer 16 of fibrous material 18 in-house and/or by a vendor. The layers 16 may be provided on single-ply material rolls 14b (FIG. 1) or multi-ply material rolls 14c (FIG. 1) in the desired resin and fiber material compositions, thicknesses, and/or fiber orientations as described above.

The resin 24 (FIG. 1) may be applied in selected areas (not shown) along the length and/or width of the layer 16 (FIG. 1) such that the resin 24 is not necessarily uniformly-distributed (not shown) over the length and/or width of the layer 16. For example, the resin 24 may be applied in areas (not shown) of the layer 16 that enable the preform 200 (FIG. 1) to maintain the die cross-sectional shape 56 (FIG. 1) after the resin 24 solidifies after heating thereof. In this regard, the cooling of the resin 24 may result in an increase in the viscosity of the resin 24 as the resin 24 in the tackified layer 16 solidifies such that the preform 200 may maintain the die cross-sectional shape 56. In this manner, the volume fraction of resin 24 applied to the layer 16 may be minimized such that the fibrous material 18 may remain generally porous to allow for substantially uniform distribution of matrix material 222 (FIG. 18) throughout the preform 200 during the infusion of matrix material 222.

The layer 16 (FIG. 1) of fibrous material 18 (FIG. 1) may be generally continuous in the sense that one or more of the layers 16 of fibrous material 18 may be dispensed from one or more material rolls 14 as shown in FIGS. 1 and 14. For example, one or more layers 16 of fibrous material 18 may be drawn from one or more single-ply material rolls 14b (FIG. 1) and/or from one or more multi-ply material rolls 14c (FIG. 1) as described above. In addition, one or more of the layers 16 of fibrous material 18 may be provided in alternative forms including folded or non-folded sheets (not shown) or in other forms.

Step 404 of the method 400 of FIG. 22 may comprise passing the layer 16 (FIG. 2) through a forming die set 50 (FIG. 2) having a die cross-sectional shape 56 (FIG. 2) as illustrated in FIGS. 1, 2, 3, 5A-5D, 6-11 and 14. For example, the layer 16 (FIG. 2) of fibrous material 18 (FIG. 2) may be pultruded or drawn through one or more forming die sets 50 (FIG. 2) using a pulling mechanism 150 (FIG. 2). The pulling mechanism 150 may comprise one or more rollers 152 (FIG. 2) that may be mounted on opposing sides of the layer 16 to clamp the layer 16 and draw the layer 16 through the forming die set 50. However, other means may be implemented for drawing the layer 16 through the forming die set 50.

Step 406 of the method 400 of FIG. 22 may comprise heating the resin 24 (FIG. 8) in the layer 16 (FIG. 8) of fibrous material 18 (FIG. 8) such as by using a heating device 110 (FIG. 8). The resin 24 may be heated by conductive heating due to contact of the layer 16 with the surfaces of the heated forming die set 50 (FIG. 8) as the layer 16 is pultruded through the forming die set 50. However, the resin 24 may be heated such as by preheating the layer 16 using a heating device 110 installed at any location upstream of the forming die set 50. For example, a heating gun (not shown) may direct hot air (not shown) onto the layer 16 to elevate the temperature of the resin 24 to soften the resin 24 and/or reduce the viscosity thereof. The resin 24 may also be heated by other means including by radiative heating using a heater emitting a wavelength of radiation that is absorbed by the resin 24 to a greater extent than that which is absorbed by the structural fibers 20 (FIG. 1). The resin 24 may also be heated due to thermal contact with an upper and/or lower forming dies (not shown) formed of ferromagnetic material (not shown) and wherein the ferromagnetic material may be inductively heated up to a Curie temperature in response to a magnetic field (not shown) generated by electrical current (not shown) applied to an induction coil (not shown) mounted adjacent to the upper and/or lower forming dies as described above.

Step 408 of the method 400 of FIG. 22 may comprise forming the layer 16 (FIG. 8) of fibrous material 18 (FIG. 8) into the die cross-sectional shape 56 (FIG. 9). The fibrous material 18 may be formed into the die cross-sectional shape 56 during heating of the resin 24 or after heat 114 (FIG. 8) is applied and the resin 24 is softened. As shown in FIG. 3, forming pressure 66 may be applied to the layer 16 when the layer 16 is pultruded through the forming die set 50. Due to heating of the resin 24 by one or more of the above-described heating devices 110 (FIG. 8) and methods, the resin 24 may soften allowing the resin 24 to be molded with the structural fibers 20 (FIG. 1) into the die cross-sectional shape 56.

Step 410 of the method 400 of FIG. 22 may comprise allowing the resin 24 (FIG. 8) to solidify. The solidification of the resin 24 may occur while the layer 16 (FIG. 8) assumes the die cross-sectional shape 56 (FIG. 9). For example, the method may include passing the layer 16 through a cooling device 130 (FIG. 10) as described above to solidify the resin 24. In this manner, the preform 200 (FIG. 9) may be maintained in the die cross-sectional shape 56.

Step 412 of the method 400 of FIG. 22 may comprise positioning one or more of the preforms 200 (FIG. 18) with a composite component (not shown) such as with additional fibrous material 214 (FIG. 18). For example, FIG. 18 illustrates a mandrel 216 installed in a hat-section 204 preform 200 and a subsequent layer 180 of fibrous material 214 being applied over the mandrel 216 and over the hat-section 204 preform 200. Each preform 200 may comprise an individual preform 200 and/or a preform assembly 242 (FIG. 17) formed of a preform stack 240 (FIG. 15) that may be consolidated under heat 114 (FIG. 16) and/or pressure 238 (FIG. 16) as described in greater detail below. Additional fibrous material 214 (FIG. 18) may be positioned with the preform 200. The assembly of the preform 200 (FIG. 18) may be vacuum-bagged and/or autoclaved for debulking and/or consolidating.

Step 414 of the method 400 of FIG. 22 may comprise infusing one or more of the preforms 200 (FIG. 18) and/or fibrous material 214 (FIG. 18) with thermosetting or thermoplastic matrix material 222 (FIG. 18). In this regard, Step 414 may be performed such that the one or more preforms 200 (FIG. 18) are infused without infusing the composite components (e.g., fibrous material 214—FIG. 18) that may be disposed with the preform(s) 200. Alternatively, Step 414 may be performed such that the preform(s) 200 and the composite components such as the additional fibrous material 214 may be infused with matrix material 222. The infusing may be performed using any suitable liquid-molding process or any other process for infusing the assembly with matrix material 222. For example, the preform 200 and additional fibrous material 214 may be infused with matrix material 222 using resin transfer molding (RTM), vacuum-assisted resin transfer molding (VARTM), resin film infusion, (RFI), bulk resin infusion (BRI), and any other method for infusing the preform 200 and the additional fibrous material 214 with matrix material 222.

Step 416 of the method 400 of FIG. 22 may comprise curing the matrix material 222 (FIG. 18) to form a composite article 250 (FIG. 19). In this regard, curing of the matrix material 222 may include the application of heat (not shown) and/or pressure (not shown) to the matrix material 222 to promote a substantially uniform infusion of the matrix material 222 throughout the structural fibers 20 (FIG. 1) of the preform 200. In an embodiment, the preform 200 and associated fibrous material 214 (FIG. 18) may be vacuum-bagged and autoclaved to provide the desired pressure and temperature profiles during curing of the assembly. The matrix material 222 may be infused into the preform 200 and the fibrous material 214 such that the final composite article 250 has a fiber-volume fraction in the range of from approximately 30 to 70 percent although larger or smaller fiber-volume fractions may be provided for the final composite article 250.

Figure 23:
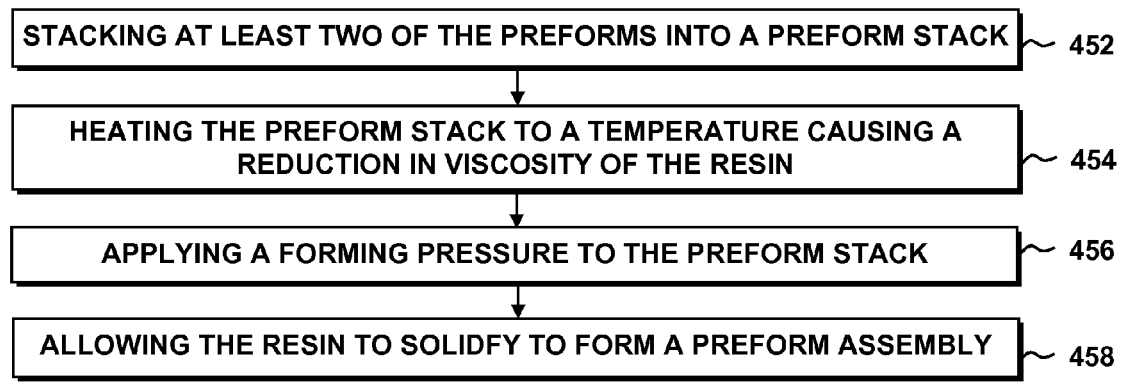
FIG. 23 is a flow diagram illustrating one or more operations that may be included in a method of forming a preform assembly.

Referring to FIG. 23, shown is a flowchart illustrating an embodiment of a method of forming multiple preforms 200 (FIG. 15) into a preform assembly 242 as mentioned above. One or more preform assemblies 242 may be combined with individual preforms 200, with one or more composite components (not shown), and/or with additional fibrous material 214 (FIG. 18) and infused with matrix material 222 (FIG. 18) to form a composite article 250 (FIG. 19).

Step 452 as shown in FIG. 23 may comprise stacking at least two of the preforms 200 (FIG. 15) into a preform stack 240 (FIG. 15) as shown in FIG. 15. The preforms 200 may be substantially similar to one another with regard to the cross-sectional shape of the preforms 200 such that the preforms 200 may be nested or aligned with one another in the stacked formation. The preforms 200 may be formed of the same type of resin 24 (FIG. 15) and fibrous material 18 (FIG. 1) at the same or different thicknesses and ply orientations, or the preforms 200 may be formed of different types of resin 24 and fibrous material 18 at different thicknesses and with different fiber orientations. For example, the preforms 200 in the preform stack 240 may be formed of different fibrous material 18 containing fibers and/or resin 24 of different material compositions. The preforms 200 in the preform stack 240 may additionally be formed of fibrous material 18 having fibers 20 (FIG. 1) with different fiber orientations in order to achieve a desired stacking sequence of the preform stack 240 as described above.

As shown in FIG. 15, two or more of the preforms 200 may be placed in the preform stack 240 between upper and lower preform dies 232, 234 of a preform die set 230 having a die cross-sectional shape 56. The preform die set 230 may be configured similar to the forming die set 50 (FIG. 1) described above. For example, the preform die set 230 (FIG. 15) may include a heating device 110 (FIG. 15) of any configuration as described above. The upper and/or lower preform dies 232, 234 of the preform die set 230 may be movable (e.g., vertically) relative to one another to successively clamp portions of a length of the preform stack 240 between the upper and lower preform dies 232, 234. Alternatively, the preform die set 230 may be stationary and the preform stack 240 may be pultruded through a gap (not shown) between the upper and lower preform dies 232, 234 similar to that which is described above for forming individual preforms 200 (FIG. 1).

Step 454 as shown in FIG. 23 may comprise applying heat 114 (FIG. 16) to the preform stack 240 (FIG. 16) to a temperature causing a reduction in the viscosity of the resin 24 (FIG. 16) such as thermoplastic resin. In this regard, the step of heating the resin 24 may comprise heating the resin 24 to a temperature that approaches or exceeds the melting temperature or the glass transition temperature of the resin 24 to allow the resin 24 to soften to reduce the viscosity of the resin 24. The resin 24 softening may promote intermingling of the resin 24 between adjacent preforms 200 (FIG. 15) in the preform stack 240. The heating of the preform stack 240 may be performed using any conductive heating using heating coils, radiative heating, inductive heating, or any one of a variety of other heating methods such as the heating methods described above with regard to forming a preform 200.

Step 456 as shown in FIG. 23 may comprise applying a compressive force 238 (FIG. 16) to the preform stack 240 (FIG. 16) as shown in FIG. 16 to facilitate the consolidation of the preforms 200 (FIG. 16) and/or promote the intermingling of the resin 24 in adjacent preforms 200. The compressive force 238 may be applied to the preform stack 240 in a predetermined amount by controlling the movement of the upper and lower preform dies 232, 234 (FIG. 16) toward one another along the direction of movement 236 (FIG. 15). Alternatively, for a stationary configuration (not shown) of the upper and lower preform dies 232, 234 (FIG. 16) wherein the preform stack 240 (FIG. 16) is pultruded through the preform die set 230, a gap (not show) between the upper and lower preform dies 232, 234 may be sized such that a desired magnitude of compressive force 238 may be applied to preform stack 240. The compressive force 238 may be such that at least a portion of the resin 24 of adjacent preforms 200 may intermingle and bond with one another.

Step 458 as shown in FIG. 23 may comprise allowing the resin 24 (FIG. 16) to solidify to form a preform assembly 242 (FIG. 17) from the preform stack 240 (FIG. 16). As shown in FIG. 17, the preform assembly 242 may assume the cross-sectional shape of the preform die set 230 (FIG. 16) upon solidification of the resin 24 (FIG. 16). For example, thermoplastic resin 24 of adjacently-disposed preforms 200 in the preform stack 240 (FIG. 16) may intermingle with one another when the thermoplastic resin 24 is heated above the melting temperature resulting in reduction in the viscosity of the thermoplastic resin 24. Upon solidification of the thermoplastic resin 24, the thermoplastic resin 24 of the adjacent preforms 200 (FIG. 16) may bond to form the preform assembly 242 (FIG. 17).

The preform assembly 242 (FIG. 17) may optionally be combined with one or more composite components (not shown) as described above in Step 412 of FIG. 22 and infused with matrix material (not shown) as described above in Step 414. Alternatively, the preform assembly 242 may be infused with matrix material (not shown) without infusing the composite component with matrix material similar to that which is described above in Step 414. The matrix material may be cured in a manner similar to that which is described above in Step 416 of FIG. 22 to form a composite component such as the hat stringer shown in FIG. 19.

Figure 24:
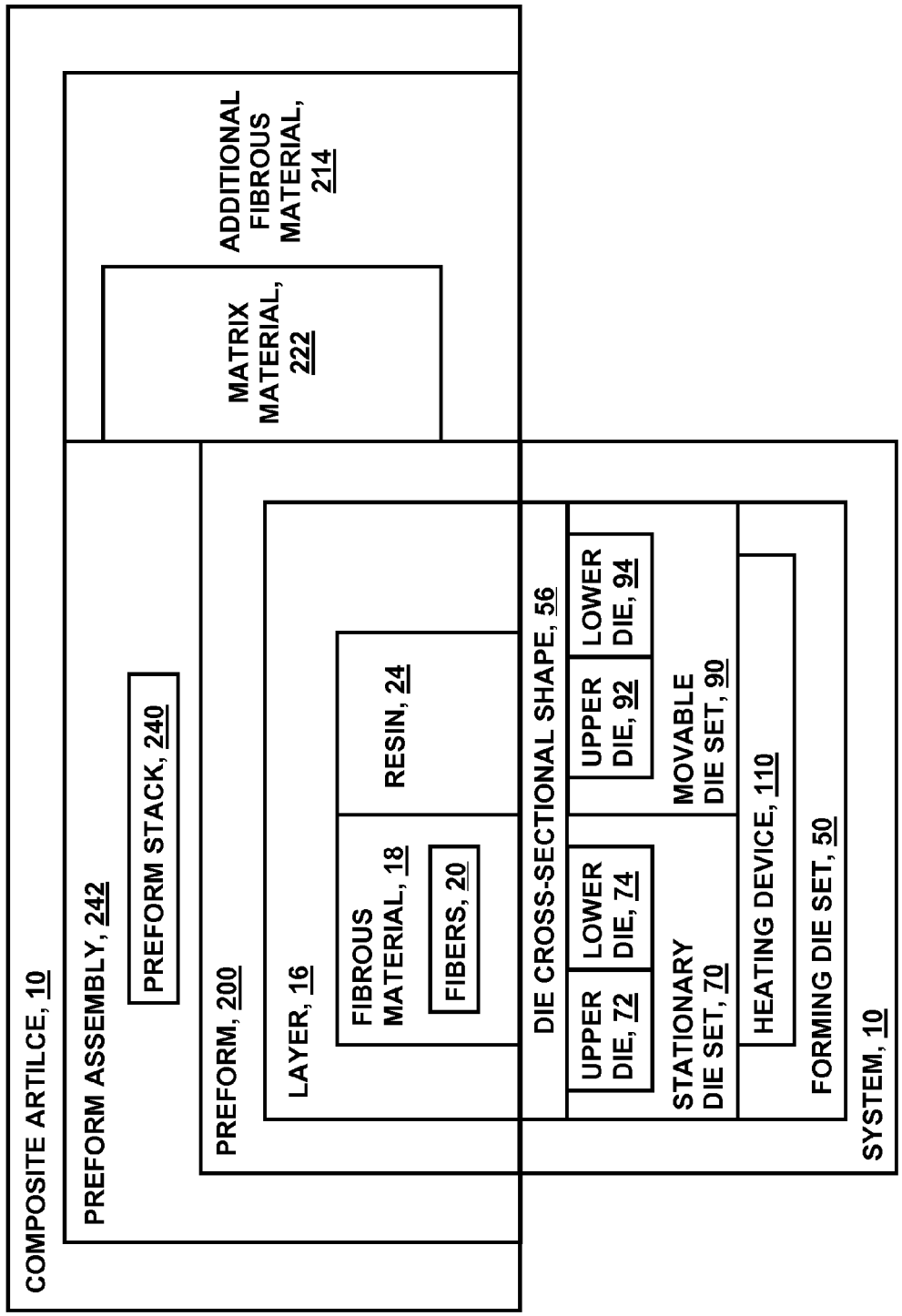
FIG. 24 is a block diagram of an embodiment of the system disclosed herein.

Referring to FIG. 24, shown is a block diagram of an embodiment of the system 10 disclosed herein. The system 10 may include a forming die set 50 comprised of a stationary forming die set 70 having upper and lower die 72, 74 for pultruding a layer 16 of fibrous material 18 having fibers 20 and resin 24 through the forming die set 50. The forming die set 50 may include a heating device 110 for heating the resin 24 such that the layer 16 may be formed into a die cross-sectional shape 56. Alternatively, the forming die set 50 may be a movable forming die set 90 having upper and lower dies 92, 94 that may be movable relative to one another to form sections of a length of the layer 16 into the die cross-sectional shape 56. The resin 24 may solidify such that a preform 200 retains the die cross-sectional shape 56. A stack 240 of preforms 200 may be formed into a preform assembly 242. One or more preforms 200 and/or one or more preform assemblies 242 may be combined with additional fibrous material 214 for infusing with matrix material 222 to form a composite article 10 upon curing of the matrix material 222.

In FIG. 24, in the above-described embodiments of forming the preform 200, the volume fraction of resin 24 is preferably such that upon solidification of the resin 24, the preform 200 may be maintained in the die cross-sectional shape 56 which may approximate the shape of the final composite article 250. Maintaining the shape of the preform 200 in the approximate shape of the final composite article 250 may facilitate handling of the fibrous material 18 without the need for tooling aids (not shown) when positioning the preform 200 with other fibrous material 214 (e.g., other preforms 200 or other fibrous material) prior to infusion of the matrix material 222 to form the final composite article 250. As indicated above, the layer(s) 16 of fibrous material 18 may contain up to approximately 10 percent by volume of resin 24. In an embodiment, the layer(s) 16 of fibrous material 18 may contain between approximately 1 to 10 percent by volume of resin 24 although larger or smaller volume fractions of resin 24 may be used. For example, the layer 16 of fibrous material 18 may include between approximately 2 to 4 percent by volume of resin 24. By minimizing the volume fraction of resin 24, the preform 200 may remain generally porous to allow for substantially uniform distribution of matrix material 222 throughout a substantial majority of the preform 200 during the infusion of matrix material 222. Additionally, by minimizing the volume fraction of resin 24, effects of the resin 24 on the strength and stiffness properties of the cured composite article 250 may be minimized.

Figure 25:
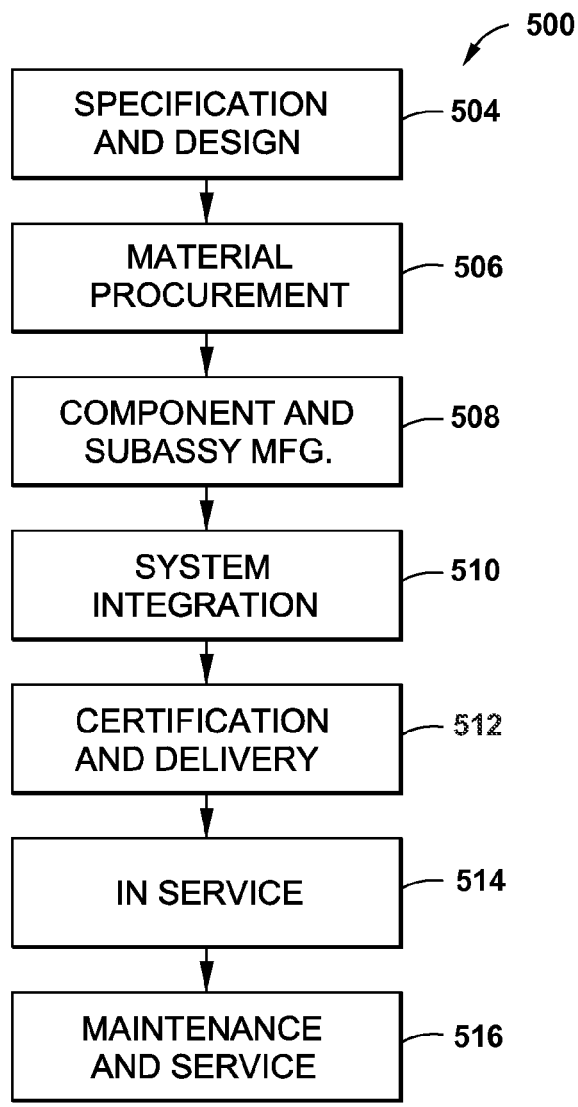
FIG. 25 is a flow diagram illustrating an aircraft production and service methodology.
Figure 26:
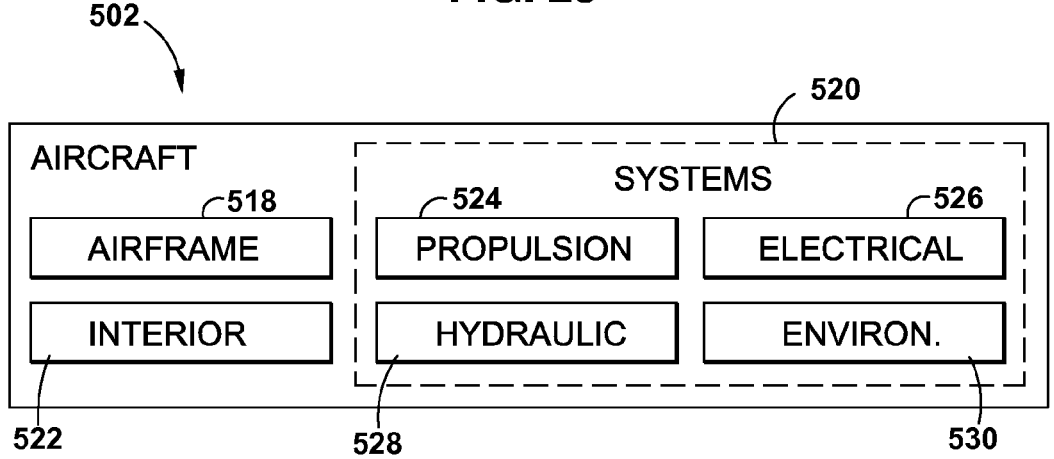
FIG. 26 is a block diagram of an aircraft.

Referring to FIGS. 25-26, embodiments of the disclosure may be described in the context of an aircraft manufacturing and service method 500 as shown in FIG. 25 and an aircraft 502 as shown in FIG. 26. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 26, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of forming a preform, comprising the steps of:
   providing a layer of tackified fibrous material containing structural fibers and resin commingled or intimately blended with the structural fibers, the resin being in solid form and being approximately 1 to 10 percent by volume of the layer of tackified fibrous material;
   passing the layer through a forming die set having a die cross-sectional shape;
   heating the resin;
   softening the resin in response to heating the resin such that the resin flows within the fibrous material;
   forming the layer into the die cross-sectional shape;
   allowing the resin to solidify in a manner such that a preform is formed in the die cross-sectional shape, the solidified resin retaining the die cross-sectional shape of the preform; and
   retaining a porous nature in the fibrous material after forming the preform.

2. The method of claim 1 wherein the resin is a thermoplastic resin, the step of allowing the resin to solidify includes:
   allowing the thermoplastic resin to cool such that the thermoplastic resin solidifies.

3. The method of claim 1 wherein:
   the layer of tackified fibrous material contains approximately 2 to 4 percent by volume of resin.

4. The method of claim 1, wherein the forming die set comprises a stationary die set, the step of passing the layer through the forming die set comprises:
   continuously pultruding the layer through the stationary die set using a pulling mechanism.

5. The method of claim 1, wherein the forming die set comprises a movable die set, the step of passing the layer through the forming die set comprises:
   sequentially forming the layer into the die cross-sectional shape by successively clamping sections of the layer between the movable die set.

6. The method of claim 1, wherein the step of heating the resin comprises at least one of the following:
   conductive heating;
   radiation heating; and
   inductive heating.

7. The method of claim 1 wherein the step of heating the layer comprises at least one of the following:
   heating a material roll of the layer of fibrous material;
   heating the forming die set and the layer in response to the layer passing therethrough.

8. The method of claim 1 wherein the step of providing the layer of tackified fibrous material comprises:
   providing the layer of fibrous material from a refrigerated material roll; and
   heating the layer of fibrous material to tackify the layer.

9. The method of claim 1, further comprising the steps of:
   positioning the preform with additional fibrous material;
   infusing the preform and the additional fibrous material with a matrix material; and
   curing the matrix material to form the final composite article.

10. The method of claim 9, wherein the final composite article has a fiber-volume fraction in a range of from approximately 30 to 70 percent.

11. The method of claim 1, wherein:
    the die cross-sectional shape varies over a length of the forming die set.

12. The method of claim 11, wherein:
    the die cross-sectional shape is tapered from an entrance to an exit of the forming die set.

13. The method of claim 1, further comprising the steps of:
    infusing the preform with a matrix material; and
    curing the matrix material to form the final composite article.

14. The method of claim 13, wherein:
    the final composite article comprises a component of at least one of an aircraft and a spacecraft.

15. The method of claim 1, wherein the resin is a thermoplastic resin having at least one of the following characteristics when in the presence of a matrix material:
at least partially soluble in the matrix material;
reactive with the matrix material; and
remaining in a phase that is different than the phase of the matrix material during curing of the matrix material.

16. The method of claim 1, further comprising the steps of:
providing at least two layers of fibrous material;
assembling the layers into a layer assembly; and
passing the layer assembly through the forming die set.

17. The method of claim 16, wherein:
each one of the layers includes fibers; and
the fibers in at least one of the layers having a different orientation than the fibers in another one of the layers.

18. The method of claim 16, further comprising at least one of the following steps:
drawing at least two of the layers from single-ply material rolls;
drawing at least two of the layers from a multi-ply material roll.

19. The method of claim 1, wherein the resin is a thermoplastic resin, the method further comprising the steps of:
stacking at least two of the preforms into a preform stack;
heating the preform stack to a temperature causing a reduction in viscosity of the thermoplastic resin;
applying a compressive force to the preform stack; and
allowing the thermoplastic resin to solidify to form a solidified preform assembly.

20. The method of claim 1, wherein the layer of fibrous material has as at least one of the following configurations:
fabric; and
organized tows.

21. A method of forming a composite article, comprising the steps of:
providing at least one layer of fibrous material containing structural fibers and resin commingled or intimately blended with the structural fibers, the resin being in solid form and being approximately 1 to 10 percent by volume of the layer of tackified fibrous material;
passing the layer through a forming die set having a die cross-sectional shape;
heating the resin with a heating device;
softening the resin in response to heating the resin such that the resin flows within the fibrous material;
forming the layer into the die cross-sectional shape;
allowing the resin to solidify in a manner such that a preform is formed in the die cross-sectional shape, the solidified resin retaining the die cross-sectional shape of the preform, the preform retaining a porous nature in the fibrous material after solidification of the resin and forming into the preform;
positioning the preform with additional fibrous material;
infusing, due to the porous nature of the fibrous material, the preform and the additional fibrous material substantially uniformly with liquid matrix material after forming the preform into the die cross-sectional shape; and
curing the liquid matrix material to form a final composite article.

* * * * *